(12) United States Patent
Kurian

(10) Patent No.: US 11,711,369 B2
(45) Date of Patent: *Jul. 25, 2023

(54) CONTROLLING ACCESS TO SECURE INFORMATION RESOURCES USING ROTATIONAL DATASETS AND DYNAMICALLY CONFIGURABLE DATA CONTAINERS

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/472,868

(22) Filed: Sep. 13, 2021

(65) Prior Publication Data

US 2021/0409410 A1    Dec. 30, 2021

Related U.S. Application Data

(63) Continuation of application No. 16/426,829, filed on May 30, 2019, now Pat. No. 11,153,315.

(51) Int. Cl.
*H04L 9/40* (2022.01)
*H04L 12/46* (2006.01)

(52) U.S. Cl.
CPC .............. *H04L 63/10* (2013.01); *H04L 63/08* (2013.01); *H04L 63/105* (2013.01); *H04L 12/46* (2013.01)

(58) Field of Classification Search
CPC ....... H04L 63/10; H04L 63/08; H04L 63/105; H04L 12/46; H04L 12/2803; H04L 67/1097
See application file for complete search history.

(56) References Cited

U.S. PATENT DOCUMENTS

| | | |
|---|---|---|
| 5,226,143 A | 7/1993 | Baird et al. |
| 5,551,046 A | 8/1996 | Mohan et al. |
| 5,596,754 A | 1/1997 | Lomet |
| 5,845,281 A | 12/1998 | Benson et al. |
| 6,581,063 B1 | 6/2003 | Kirkman |
| 6,978,371 B1 | 12/2005 | Yu |
| 7,107,298 B2 | 9/2006 | Prahlad et al. |

(Continued)

*Primary Examiner* — Aravind K Moorthy
(74) *Attorney, Agent, or Firm* — Banner & Witcoff, Ltd.

(57) ABSTRACT

Aspects of the disclosure relate to controlling access to secure information resources using rotational datasets and dynamically configurable data containers. A computing platform may receive, from a requesting system, a data access request. After authenticating the requesting system, the computing platform may load, using a first data container, first source data from a data track. The computing platform may send the first source data to a second data container. Then, the computing platform may load, using the second data container, second source data from the data track and may produce a first combined dataset. The computing platform may send the first combined dataset to a third data container. Subsequently, the computing platform may load, using the third data container, third source data from the data track and may produce a second combined dataset. Thereafter, the computing platform may send, to the requesting system, the second combined dataset.

20 Claims, 22 Drawing Sheets

(56) References Cited

U.S. PATENT DOCUMENTS

| | | | |
|---|---|---|---|
| 7,213,208 | B2 | 5/2007 | Reichel et al. |
| 7,328,457 | B1 | 2/2008 | Mister |
| 7,865,475 | B1* | 1/2011 | Yadav .................. G06F 16/128 |
| | | | 707/655 |
| 8,473,576 | B2 | 6/2013 | Philipeit |
| 8,489,811 | B1* | 7/2013 | Corbett ................ G06F 16/188 |
| | | | 707/827 |
| 8,712,163 | B1 | 4/2014 | Osheroff |
| 8,978,159 | B1 | 3/2015 | van Dijk et al. |
| 9,083,688 | B2* | 7/2015 | Vitzthum ............. H04N 21/835 |
| 9,298,707 | B1* | 3/2016 | Zhang ................ G06F 11/1453 |
| 9,483,350 | B1 | 11/2016 | Camp et al. |
| 9,552,272 | B1 | 1/2017 | Liang et al. |
| 9,589,146 | B2 | 3/2017 | Averdunk et al. |
| 9,703,965 | B1 | 7/2017 | Robinson et al. |
| 9,858,431 | B2 | 1/2018 | Farkash et al. |
| 9,866,634 | B1 | 1/2018 | Choy et al. |
| 9,935,772 | B1 | 4/2018 | Madisetti et al. |
| 10,216,512 | B1* | 2/2019 | Mathew .................... G06F 8/41 |
| 10,311,223 | B2 | 6/2019 | Adams et al. |
| 10,521,419 | B1* | 12/2019 | Swamy ............. G06Q 10/0639 |
| 10,523,699 | B1 | 12/2019 | Alamuri |
| 10,540,813 | B1 | 1/2020 | Uhlenbrock et al. |
| 10,600,050 | B1* | 3/2020 | Anton ................ G06Q 20/3672 |
| 10,614,041 | B2* | 4/2020 | McFerrin .................. G06F 3/06 |
| 10,614,230 | B2 | 4/2020 | Rietsch |
| 10,623,186 | B1 | 4/2020 | Mehr |
| 10,686,792 | B1 | 6/2020 | Keefer et al. |
| 10,965,547 | B1 | 3/2021 | Esposito et al. |
| 10,983,908 | B1 | 4/2021 | Zou et al. |
| 10,990,518 | B1* | 4/2021 | Wallace .................. G06F 16/13 |
| 11,099,902 | B1* | 8/2021 | Matthews ............. G06F 9/5027 |
| 11,128,530 | B2* | 9/2021 | Shimoga Manjunatha ................ H04L 43/16 |
| 11,165,777 | B2 | 11/2021 | Kurian |
| 11,328,222 | B1* | 5/2022 | Matthews ........... H04L 49/3027 |
| 2003/0093695 | A1 | 5/2003 | Dutta |
| 2004/0059932 | A1 | 3/2004 | Takeuchi et al. |
| 2005/0268108 | A1 | 12/2005 | Mehra et al. |
| 2006/0112107 | A1* | 5/2006 | Jones ..................... G06F 16/27 |
| 2006/0291657 | A1 | 12/2006 | Benson et al. |
| 2007/0006325 | A1 | 1/2007 | Gargaro |
| 2007/0033355 | A1* | 2/2007 | Maki .................. G06F 11/2058 |
| | | | 711/162 |
| 2008/0098217 | A1* | 4/2008 | Pletka .................. G06F 21/6218 |
| | | | 713/181 |
| 2009/0187986 | A1 | 7/2009 | Ozeki |
| 2010/0013832 | A1 | 1/2010 | Xiao et al. |
| 2010/0098256 | A1 | 4/2010 | Kirshenbaum |
| 2010/0132016 | A1 | 5/2010 | Ferris |
| 2010/0154042 | A1 | 6/2010 | Miyamoto et al. |
| 2010/0215255 | A1 | 8/2010 | Xiao et al. |
| 2010/0257578 | A1 | 10/2010 | Shukla et al. |
| 2010/0306835 | A1* | 12/2010 | Coan ...................... H04L 63/08 |
| | | | 705/325 |
| 2010/0332401 | A1 | 12/2010 | Prahlad et al. |
| 2011/0047597 | A1 | 2/2011 | Mahaffey et al. |
| 2011/0047620 | A1 | 2/2011 | Mahaffey et al. |
| 2011/0099200 | A1 | 4/2011 | Blount et al. |
| 2011/0271135 | A1* | 11/2011 | Kobashi ............. G06F 16/2379 |
| | | | 713/600 |
| 2011/0311051 | A1 | 12/2011 | Resch et al. |
| 2012/0066756 | A1 | 3/2012 | Vysogorets et al. |
| 2012/0066757 | A1 | 3/2012 | Vysogorets et al. |
| 2012/0311300 | A1 | 12/2012 | Sundrani et al. |
| 2013/0205362 | A1 | 8/2013 | Kiehtreiber et al. |
| 2013/0208893 | A1 | 8/2013 | Shablygin et al. |
| 2013/0227287 | A1 | 8/2013 | Quinlan et al. |
| 2013/0275381 | A1 | 10/2013 | De Schrijvr et al. |
| 2013/0340028 | A1 | 12/2013 | Rajagopal et al. |
| 2014/0007184 | A1 | 1/2014 | Porras |
| 2014/0281514 | A1 | 9/2014 | Erofeev et al. |
| 2014/0282900 | A1* | 9/2014 | Wang ...................... H04L 63/04 |
| | | | 726/4 |
| 2015/0007265 | A1* | 1/2015 | Aissi ........................ G06F 21/60 |
| | | | 726/22 |
| 2015/0067759 | A1 | 3/2015 | Beard et al. |
| 2015/0186214 | A1* | 7/2015 | Gladwin ............. G06F 11/0793 |
| | | | 714/766 |
| 2015/0188906 | A1 | 7/2015 | Minov et al. |
| 2015/0193474 | A1 | 7/2015 | Deng et al. |
| 2015/0205973 | A1 | 7/2015 | Huh et al. |
| 2015/0212889 | A1 | 7/2015 | Amarendran et al. |
| 2015/0261774 | A1* | 9/2015 | McFerrin ................ H04L 67/34 |
| | | | 707/803 |
| 2015/0271267 | A1 | 9/2015 | Solis et al. |
| 2015/0339307 | A1 | 11/2015 | Hultgren et al. |
| 2016/0050258 | A1 | 2/2016 | Chang et al. |
| 2016/0078245 | A1 | 3/2016 | Amarendran et al. |
| 2016/0085797 | A1 | 3/2016 | Patiejunas et al. |
| 2016/0109875 | A1 | 4/2016 | Majewski et al. |
| 2016/0188421 | A1* | 6/2016 | Karinta ................. G06F 16/188 |
| | | | 707/654 |
| 2016/0191659 | A1 | 6/2016 | Farrell |
| 2016/0224422 | A1 | 8/2016 | Resch et al. |
| 2016/0301676 | A1 | 10/2016 | Gounares |
| 2016/0379083 | A1 | 12/2016 | Sala et al. |
| 2017/0006066 | A1 | 1/2017 | Eckel |
| 2017/0006126 | A1 | 1/2017 | Long, III et al. |
| 2017/0061138 | A1 | 3/2017 | Lambert |
| 2017/0093913 | A1 | 3/2017 | Summers et al. |
| 2017/0126642 | A1 | 5/2017 | Basin |
| 2017/0160118 | A1* | 6/2017 | Williams ................ H04L 67/12 |
| 2017/0177249 | A1 | 6/2017 | Kurilov et al. |
| 2017/0180249 | A1* | 6/2017 | Shen .................. H04L 41/0895 |
| 2017/0180250 | A1* | 6/2017 | Shen ................... H04L 45/586 |
| 2017/0180391 | A1* | 6/2017 | Hinchliffe ............. H04W 12/10 |
| 2017/0228182 | A1 | 8/2017 | Novak et al. |
| 2017/0235938 | A1 | 8/2017 | Cambou et al. |
| 2017/0255790 | A1 | 9/2017 | Barrett et al. |
| 2017/0264619 | A1 | 9/2017 | Narayanaswamy et al. |
| 2017/0283236 | A1* | 10/2017 | Jagannathan .......... B67D 1/1293 |
| 2017/0286525 | A1 | 10/2017 | Li et al. |
| 2017/0357548 | A1 | 12/2017 | Grube et al. |
| 2017/0364893 | A1 | 12/2017 | Kurian |
| 2018/0089029 | A1 | 3/2018 | Resch et al. |
| 2018/0097809 | A1 | 4/2018 | Chakrabarti et al. |
| 2018/0124068 | A1 | 5/2018 | Ruhlen et al. |
| 2018/0143990 | A1* | 5/2018 | Figueroa ............. G06F 11/1464 |
| 2018/0159871 | A1 | 6/2018 | Komashinskiy et al. |
| 2018/0176206 | A1* | 6/2018 | Matthews ............. H04L 63/083 |
| 2018/0196816 | A1 | 7/2018 | Maybee et al. |
| 2018/0205708 | A1 | 7/2018 | Kurian et al. |
| 2018/0213036 | A1* | 7/2018 | Vasetsky ............... H04L 41/082 |
| 2018/0241561 | A1 | 8/2018 | Albertson et al. |
| 2018/0246813 | A1 | 8/2018 | Goldsack et al. |
| 2018/0247071 | A1 | 8/2018 | Resch |
| 2018/0278613 | A1 | 9/2018 | Ganda |
| 2018/0307509 | A1 | 10/2018 | Dai et al. |
| 2018/0316494 | A1 | 11/2018 | Kurian et al. |
| 2018/0322138 | A1 | 11/2018 | Chang |
| 2018/0337942 | A1* | 11/2018 | Htay ....................... G06F 16/00 |
| 2018/0357447 | A1 | 12/2018 | Chen et al. |
| 2018/0365423 | A1* | 12/2018 | Poppe ........................ G06F 8/65 |
| 2018/0375838 | A1 | 12/2018 | Hersans et al. |
| 2019/0018844 | A1 | 1/2019 | Bhagwat et al. |
| 2019/0051083 | A1 | 2/2019 | Goldberg et al. |
| 2019/0051086 | A1 | 2/2019 | Goldberg et al. |
| 2019/0051087 | A1 | 2/2019 | Goldberg et al. |
| 2019/0051089 | A1 | 2/2019 | Jefferies et al. |
| 2019/0051090 | A1 | 2/2019 | Goldberg et al. |
| 2019/0052631 | A1 | 2/2019 | Momchilov et al. |
| 2019/0052698 | A1 | 2/2019 | Gao et al. |
| 2019/0063881 | A1 | 2/2019 | Abramov et al. |
| 2019/0068953 | A1 | 2/2019 | Choi et al. |
| 2019/0070358 | A1 | 3/2019 | Tieck et al. |
| 2019/0075135 | A1 | 3/2019 | Hernoud et al. |
| 2019/0076597 | A1 | 3/2019 | Tieck et al. |
| 2019/0080791 | A1 | 3/2019 | Wolf et al. |
| 2019/0080792 | A1 | 3/2019 | Chack et al. |
| 2019/0081867 | A1 | 3/2019 | Lipstone et al. |
| 2019/0087082 | A1 | 3/2019 | Chaudhri et al. |
| 2019/0087594 | A1 | 3/2019 | Nix |

(56) References Cited

U.S. PATENT DOCUMENTS

| | | |
|---|---|---|
| 2019/0088055 A1 | 3/2019 | Homad |
| 2019/0088156 A1 | 3/2019 | Choi et al. |
| 2019/0089540 A1 | 3/2019 | Jaatinen et al. |
| 2019/0091107 A1 | 3/2019 | Brady et al. |
| 2019/0095277 A1* | 3/2019 | Hegde ................ G06F 3/0641 |
| 2019/0095505 A1 | 3/2019 | Young et al. |
| 2019/0097794 A1 | 3/2019 | Nix |
| 2019/0097808 A1 | 3/2019 | Scott |
| 2019/0097962 A1 | 3/2019 | Young et al. |
| 2019/0103179 A1 | 4/2019 | Fateh et al. |
| 2019/0103641 A1 | 4/2019 | O'Hora |
| 2019/0104976 A1 | 4/2019 | Reynolds et al. |
| 2019/0109772 A1 | 4/2019 | Lipstone et al. |
| 2019/0112171 A1 | 4/2019 | High et al. |
| 2019/0114440 A1 | 4/2019 | Mani et al. |
| 2019/0116124 A1* | 4/2019 | Pignataro ............... H04L 47/32 |
| 2019/0116314 A1 | 4/2019 | Tran et al. |
| 2019/0121956 A1 | 4/2019 | Turgeman |
| 2019/0125122 A1 | 5/2019 | Feola |
| 2019/0125361 A1 | 5/2019 | Shelton, IV et al. |
| 2019/0125454 A1 | 5/2019 | Stokes et al. |
| 2019/0125455 A1 | 5/2019 | Shelton, IV et al. |
| 2019/0125456 A1 | 5/2019 | Shelton, IV et al. |
| 2019/0125457 A1 | 5/2019 | Parihar et al. |
| 2019/0125458 A1 | 5/2019 | Shelton, IV et al. |
| 2019/0125459 A1 | 5/2019 | Shelton, IV et al. |
| 2019/0131023 A1 | 5/2019 | Littmann et al. |
| 2019/0133888 A1 | 5/2019 | Lam |
| 2019/0134901 A1 | 5/2019 | Douglas et al. |
| 2019/0135501 A1 | 5/2019 | Chandra et al. |
| 2019/0138339 A1* | 5/2019 | Hacker ............... G06F 9/45558 |
| 2019/0138621 A1 | 5/2019 | Tobias et al. |
| 2019/0139640 A1 | 5/2019 | Kamen et al. |
| 2019/0141063 A1 | 5/2019 | Hamdi |
| 2019/0141380 A1 | 5/2019 | Gordon et al. |
| 2019/0146867 A1 | 5/2019 | Flynn et al. |
| 2019/0156206 A1 | 5/2019 | Graham et al. |
| 2019/0158938 A1 | 5/2019 | Bowen et al. |
| 2019/0163923 A1 | 5/2019 | Cavanaugh |
| 2019/0163924 A1 | 5/2019 | Resch et al. |
| 2019/0182322 A1 | 6/2019 | Kumar et al. |
| 2019/0199687 A1 | 6/2019 | Lan et al. |
| 2019/0236284 A1 | 8/2019 | Hersans |
| 2019/0245857 A1 | 8/2019 | Pe'er et al. |
| 2019/0251278 A1* | 8/2019 | Kalinichenko ....... H04L 9/0825 |
| 2019/0258778 A1 | 8/2019 | Park |
| 2019/0258813 A1 | 8/2019 | Lewis et al. |
| 2019/0265898 A1 | 8/2019 | Baptist et al. |
| 2019/0266052 A1 | 8/2019 | Lamba et al. |
| 2019/0266275 A1 | 8/2019 | Wernze et al. |
| 2019/0266340 A1 | 8/2019 | Chang et al. |
| 2019/0334719 A1 | 10/2019 | Naqvi et al. |
| 2019/0339687 A1* | 11/2019 | Cella ............... G05B 19/41845 |
| 2019/0339688 A1* | 11/2019 | Cella ........................ H04L 1/18 |
| 2019/0379531 A1* | 12/2019 | Aleksander .......... G06Q 20/363 |
| 2019/0379671 A1 | 12/2019 | Sundar |
| 2020/0012743 A1* | 1/2020 | Tucker ................... H04L 67/60 |
| 2020/0021615 A1 | 1/2020 | Wainner et al. |
| 2020/0026732 A1 | 1/2020 | Bequet et al. |
| 2020/0052901 A1 | 2/2020 | Wicaksono et al. |
| 2020/0076811 A1* | 3/2020 | Rudden .................. G06F 21/53 |
| 2020/0089793 A1 | 3/2020 | Lewis |
| 2020/0097590 A1 | 3/2020 | Perrin et al. |
| 2020/0110728 A1 | 4/2020 | Semenov et al. |
| 2020/0112525 A1 | 4/2020 | Donley et al. |
| 2020/0125454 A1 | 4/2020 | Naidu et al. |
| 2020/0136799 A1 | 4/2020 | Smith et al. |
| 2020/0175194 A1 | 6/2020 | Marathe et al. |
| 2020/0202333 A1 | 6/2020 | Tadayon et al. |
| 2020/0210371 A1 | 7/2020 | Groves |
| 2020/0211293 A1 | 7/2020 | Kim et al. |
| 2020/0234375 A1 | 7/2020 | Natanzon |
| 2020/0252801 A1* | 8/2020 | Käufer .................... H04L 9/083 |
| 2020/0257793 A1 | 8/2020 | Alzahrani et al. |
| 2020/0274894 A1* | 8/2020 | Argoeti .................. G06F 7/556 |
| 2020/0285386 A1* | 9/2020 | Nelogal ................. G06N 3/084 |
| 2020/0293679 A1* | 9/2020 | Handy Bosma .... G06F 21/6245 |
| 2020/0311729 A1 | 10/2020 | Matthews et al. |
| 2020/0322320 A1 | 10/2020 | Moon et al. |
| 2020/0380147 A1 | 12/2020 | Kurian |
| 2020/0382505 A1 | 12/2020 | Kurian |
| 2020/0382506 A1 | 12/2020 | Kurian |
| 2020/0389317 A1 | 12/2020 | Dunjic et al. |
| 2020/0396588 A1 | 12/2020 | Lamberton et al. |
| 2021/0021426 A1 | 1/2021 | Scherrer et al. |
| 2021/0036854 A1 | 2/2021 | Dunjic et al. |
| 2021/0081364 A1 | 3/2021 | Jiang et al. |
| 2021/0097202 A1 | 4/2021 | Datta et al. |
| 2021/0144013 A1 | 5/2021 | Chen |
| 2022/0029997 A1 | 1/2022 | Kurian |

\* cited by examiner

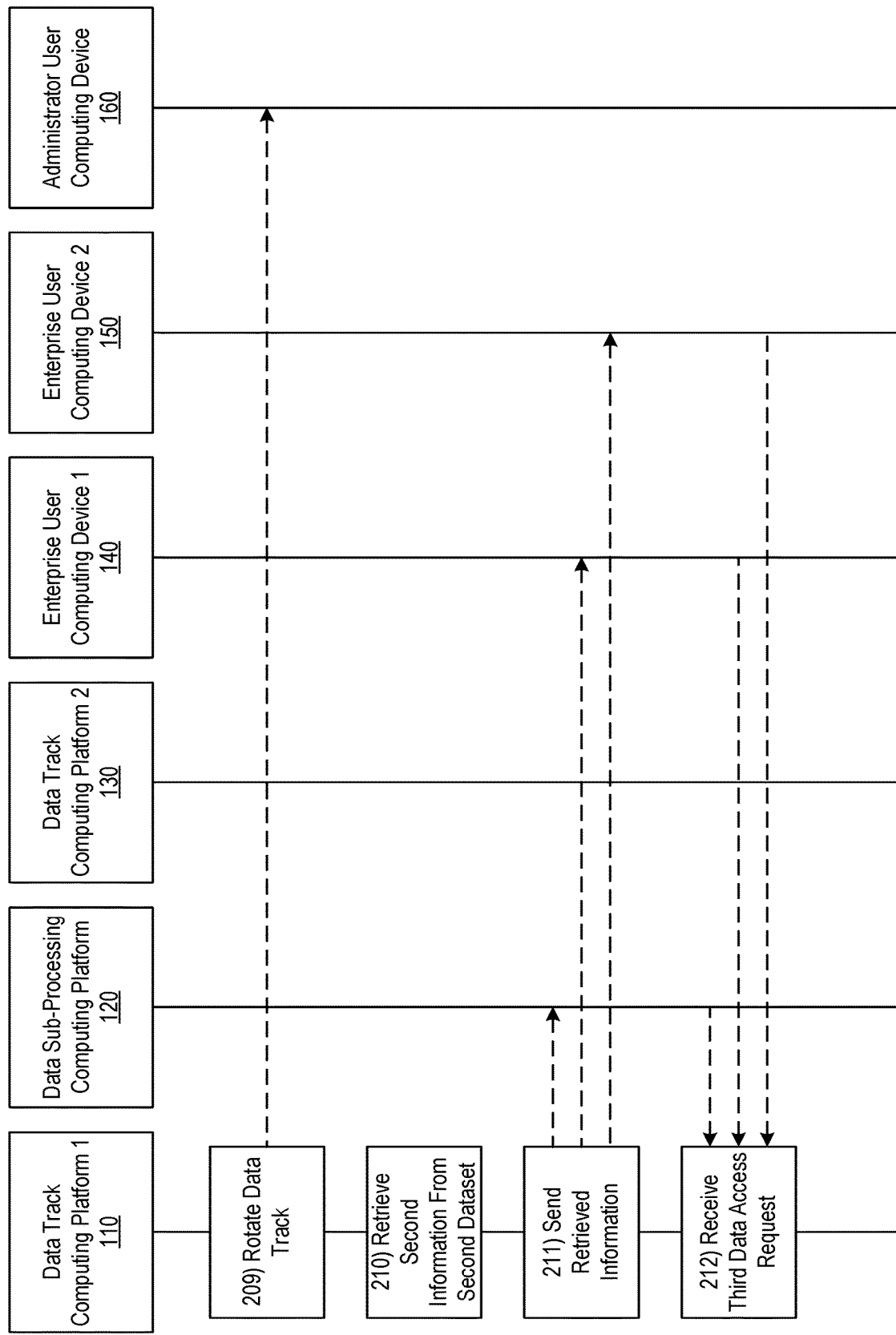

CONTROLLING ACCESS TO SECURE INFORMATION RESOURCES USING ROTATIONAL DATASETS AND DYNAMICALLY CONFIGURABLE DATA CONTAINERS

CROSS-REFERENCE TO RELATED APPLICATIONS

This application claims the benefit of and is a continuation of U.S. patent application Ser. No. 16/426,829, filed May 30, 2019, and entitled "Controlling Access to Secure Information Resources Using Rotational Datasets and Dynamically Configurable Data Containers" which is incorporated by reference herein in its entirety.

BACKGROUND

Aspects of the disclosure relate to deploying digital data processing systems, providing information security, and preventing unauthorized access to resources of an information system. In particular, one or more aspects of the disclosure relate to controlling access to secure information resources using rotational datasets and dynamically configurable data containers.

Enterprise organizations may utilize various computing infrastructure to maintain large data sets, which may include confidential information and/or other sensitive data that is created and/or used for various purposes. In some instances, these large data sets may need to be accessed by and/or transferred across various networks and/or between various computer systems. Ensuring security when accessing and/or transferring such data may be critically important to protect the integrity and confidentiality of the underlying information. In many instances, however, it may be difficult to ensure the integrity and confidentiality of the information associated with the data sets while also attempting to optimize the resource utilization, bandwidth utilization, and efficient operations of the computing infrastructure involved in maintaining, accessing, and transferring the data.

SUMMARY

Aspects of the disclosure provide effective, efficient, scalable, and convenient technical solutions that address and overcome the technical problems associated with ensuring information security and preventing unauthorized access to resources of enterprise computer systems by controlling access to secure information resources using rotational datasets and dynamically configurable data containers.

In accordance with one or more embodiments, a computing platform having at least one processor, a communication interface, and memory may receive, via the communication interface, from a first reader-writer system, a first data access request. Based on receiving the first data access request from the first reader-writer system, the computing platform may authenticate the first reader-writer system using a first data container object. After authenticating the first reader-writer system using the first data container object, the computing platform may rotate a first data track comprising a plurality of datasets to align a first dataset of the plurality of datasets with the first data container object. After rotating the first data track comprising the plurality of datasets to align the first dataset of the plurality of datasets with the first data container object, the computing platform may retrieve first information from the first dataset using the first data container object. Subsequently, the computing platform may send, via the communication interface, to the first reader-writer system, the first information retrieved from the first dataset using the first data container object.

In some embodiments, receiving the first data access request from the first reader-writer system may include receiving the first data access request from an enterprise user computing device. In some embodiments, receiving the first data access request from the first reader-writer system may include receiving the first data access request from a data sub-processing computing platform that interfaces with an additional data track computing platform which maintains a second data track different from the first data track.

In some embodiments, rotating the first data track comprising the plurality of datasets to align the first dataset of the plurality of datasets with the first data container object may include: identifying the first dataset of the plurality of datasets as having content data corresponding to the first data access request received from the first reader-writer system; and rotating the first data track comprising the plurality of datasets to align the first dataset of the plurality of datasets with the first data container object in response to identifying the first dataset of the plurality of datasets as having the content data corresponding to the first data access request received from the first reader-writer system.

In some embodiments, the first data container object may enforce a plurality of access rules on the first dataset of the plurality of datasets after the first data track comprising the plurality of datasets is rotated to align the first dataset of the plurality of datasets with the first data container object. In some embodiments, the plurality of access rules enforced on the first dataset of the plurality of datasets by the first data container object may include one or more security-level access rules. In some embodiments, the plurality of access rules enforced on the first dataset of the plurality of datasets by the first data container object may include one or more content-type access rules.

In some embodiments, rotating the first data track comprising the plurality of datasets to align the first dataset of the plurality of datasets with the first data container object may include rotating a data-container layer comprising the first data container object and at least one additional data container object different from the first data container object.

In some embodiments, the computing platform may receive, via the communication interface, from a second reader-writer system, a second data access request. Based on receiving the second data access request from the second reader-writer system, the computing platform may authenticate the second reader-writer system using a second data container object. After authenticating the second reader-writer system using the second data container object, the computing platform may add the second data access request to a queue of data access requests to be executed.

In some embodiments, when the second data access request reaches an endpoint of the queue of data access requests to be executed, the computing platform may rotate the first data track comprising the plurality of datasets to align a second dataset of the plurality of datasets with the second data container object. After rotating the first data track comprising the plurality of datasets to align the second dataset of the plurality of datasets with the second data container object, the computing platform may retrieve second information from the second dataset using the second data container object. Subsequently, the computing platform may send, via the communication interface, to the second reader-writer system, the second information retrieved from the second dataset using the second data container object.

In some embodiments, the computing platform may receive, via the communication interface, from a third reader-writer system, a third data access request. Based on receiving the third data access request from the third reader-writer system, the computing platform may attempt to authenticate the third reader-writer system using a third data container object. Based on failing to authenticate the third reader-writer system using the third data container object, the computing platform may erect a blocker object between the third data container object and the third reader-writer system.

In accordance with one or more additional embodiments, a computing platform having at least one processor, a communication interface, and memory may receive, via the communication interface, from a first enterprise user computing device, a first data transfer request comprising information scheduling a first data transfer operation. Based on receiving the first data transfer request from the first enterprise user computing device, the computing platform may retrieve first information from a first data track computing platform. Subsequently, the computing platform may configure a second data track computing platform to receive the first information retrieved from the first data track computing platform. After configuring the second data track computing platform to receive the first information retrieved from the first data track computing platform, the computing platform may send, via the communication interface, to the second data track computing platform, the first information retrieved from the first data track computing platform. In addition, sending the first information retrieved from the first data track computing platform to the second data track computing platform may cause the second data track computing platform to store the first information retrieved from the first data track computing platform.

In some embodiments, receiving the first data transfer request from the first enterprise user computing device may include receiving information scheduling a one-time archival operation. In some embodiments, receiving the first data transfer request from the first enterprise user computing device may include receiving information scheduling a periodic archival operation.

In some embodiments, retrieving the first information from the first data track computing platform may include: generating one or more first rotation commands for the first data track computing platform; and sending the one or more first rotation commands generated for the first data track computing platform to the first data track computing platform.

In some embodiments, sending the one or more first rotation commands generated for the first data track computing platform to the first data track computing platform may cause the first data track computing platform to rotate a first data track maintained by the first data track computing platform. In addition, the first data track maintained by the first data track computing platform may include a plurality of datasets. Additionally, sending the one or more first rotation commands generated for the first data track computing platform to the first data track computing platform may cause the first data track computing platform to rotate the first data track to align a first dataset of the plurality of datasets with a first data container object.

In some embodiments, sending the one or more first rotation commands generated for the first data track computing platform to the first data track computing platform may cause the first data track computing platform to rotate a data-container layer comprising the first data container object and at least one additional data container object different from the first data container object.

In some embodiments, configuring the second data track computing platform to receive the first information retrieved from the first data track computing platform may include: generating one or more second rotation commands for the second data track computing platform; and sending the one or more second rotation commands generated for the second data track computing platform to the second data track computing platform.

In some embodiments, generating the one or more second rotation commands for the second data track computing platform may include generating the one or more second rotation commands for the second data track computing platform based on one or more tags associated with the first information retrieved from the first data track computing platform.

In some embodiments, sending the one or more second rotation commands generated for the second data track computing platform to the second data track computing platform may cause the second data track computing platform to rotate a second data track maintained by the second data track computing platform.

In some embodiments, sending the one or more second rotation commands generated for the second data track computing platform to the second data track computing platform may cause the second data track computing platform to rotate a data-container layer comprising a plurality of data container objects.

In some embodiments, sending the first information retrieved from the first data track computing platform to the second data track computing platform may include sending the first information retrieved from the first data track computing platform to the second data track computing platform via a plurality of data filters managed by the computing platform.

In some embodiments, the computing platform may receive, via the communication interface, from a second enterprise user computing device different from the first enterprise user computing device, a second data transfer request comprising information scheduling a second data transfer operation. Based on receiving the second data transfer request from the second enterprise user computing device, the computing platform may retrieve second information from the first data track computing platform. Subsequently, the computing platform may configure the second data track computing platform to receive the second information retrieved from the first data track computing platform. After configuring the second data track computing platform to receive the second information retrieved from the first data track computing platform, the computing platform may send, via the communication interface, to the second data track computing platform, the second information retrieved from the first data track computing platform. In addition, sending the second information retrieved from the first data track computing platform to the second data track computing platform may cause the second data track computing platform to store the second information retrieved from the first data track computing platform.

In accordance with one or more additional embodiments, a computing platform having at least one processor, a communication interface, and memory may receive, via the communication interface, from a first requesting system, a first data access request. Based on receiving the first data access request from the first requesting system, the computing platform may authenticate the first requesting system using a first data container object. After authenticating the first requesting system using the first data container object, the computing platform may load, using the first data container object, first source data from a first data track maintained by the computing platform, and the first data track maintained by the computing platform may include a plurality of datasets. Subsequently, the computing platform may send the first source data loaded using the first data container object to a second data container object different from the first data container object. Then, the computing platform may load, using the second data container object, second source data from the first data track maintained by the computing platform. Thereafter, the computing platform may combine, at the second data container object, the second source data loaded using the second data container object and the first source data loaded using the first data container object to produce a first combined dataset. Next, the computing platform may send the first combined dataset to a third data container object different from the first data container object and the second data container object. Subsequently, the computing platform may load, using the third data container object, third source data from the first data track maintained by the computing platform. Then, the computing platform may combine, at the third data container object, the third source data loaded using the third data container object and the first combined dataset to produce a second combined dataset. Thereafter, the computing platform may send, via the communication interface, to the first requesting system, the second combined dataset.

In some embodiments, receiving the first data access request from the first requesting system may include receiving the first data access request from a first reader-writer system. In some embodiments, receiving the first data access request from the first requesting system may include receiving the first data access request from a data sub-processing computing platform that interfaces with an additional data track computing platform which maintains a second data track different from the first data track.

In some embodiments, loading the first source data from the first data track maintained by the computing platform using the first data container object may include rotating the first data track to align a first dataset of the plurality of datasets with the first data container object.

In some embodiments, loading the second source data from the first data track maintained by the computing platform using the second data container object may include loading the second source data from the first data track maintained by the computing platform using the second data container object based on re-authenticating the first requesting system using the second data container object. In some embodiments, loading the second source data from the first data track maintained by the computing platform using the second data container object may include rotating the first data track to align a second dataset of the plurality of datasets with the second data container object.

In some embodiments, combining the second source data loaded using the second data container object and the first source data loaded using the first data container object to produce the first combined dataset may include filtering the second source data loaded using the second data container object and the first source data loaded using the first data container object to remove redundant data.

In some embodiments, sending the first combined dataset to the third data container object different from the first data container object and the second data container object may include sending the first combined dataset to the third data container object based on the first data container object having a first ruleset associated with a first data type, the second data container object having a second ruleset associated with a second data type, and the third data container object having a third ruleset associated with a third data type.

In some embodiments, loading the third source data from the first data track maintained by the computing platform using the third data container object may include loading the third source data from the first data track maintained by the computing platform using the third data container object based on re-authenticating the first requesting system using the third data container object. In some embodiments, loading the third source data from the first data track maintained by the computing platform using the third data container object may include rotating the first data track to align a third dataset of the plurality of datasets with the third data container object.

In some embodiments, combining the third source data loaded using the third data container object and the first combined dataset to produce the second combined dataset may include filtering the third source data loaded using the third data container object and the first combined dataset to remove redundant data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for controlling access to secure information resources using rotational datasets and dynamically configurable data containers in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
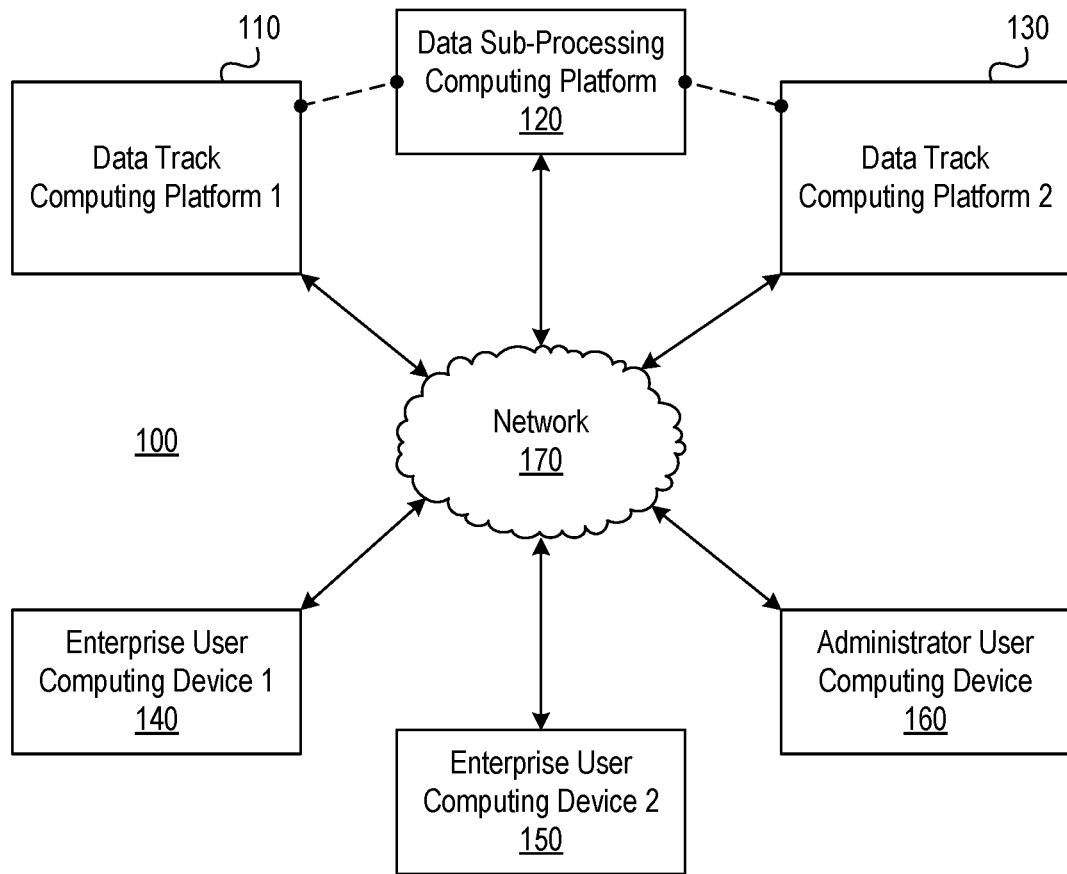
FIGS. 1A-1G depict one or more illustrative computing environments for controlling access to secure information resources using rotational datasets and dynamically configurable data containers in accordance with one or more example embodiments.

FIGS. 1A-1G depict one or more illustrative computing environments for controlling access to secure information resources using rotational datasets and dynamically configurable data containers in accordance with one or more example embodiments. Referring to FIG. 1A, computing environment 100 may include one or more computer systems. For example, computing environment 100 may include a first data track computing platform 110, a data sub-processing computing platform 120, a second data track computing platform 130, a first enterprise user computing device 140, a second enterprise user computing device 150, and an administrator user computing device 160.

As illustrated in greater detail below, data track computing platform 110 may include one or more computing devices configured to perform one or more of the functions described herein. For example, data track computing platform 110 may include one or more computers (e.g., laptop computers, desktop computers, servers, server blades, or the like).

Data sub-processing computing platform 120 may include one or more computing devices and/or other computer components (e.g., processors, memories, communication interfaces). In addition, and as illustrated in greater detail below, data sub-processing computing platform 120 may be configured to coordinate and manage data transfers and/or other operations (which may, e.g., involve managing interactions with and/or executing actions on one or more data track computing platforms and/or other devices in computing environment 100).

Data track computing platform 130 may include one or more computing devices, similar to data track computing platform 110. For example, data track computing platform 130 may include one or more computers (e.g., laptop computers, desktop computers, servers, server blades, or the like). In addition, and as illustrated in greater detail below, data track computing platform 130 may be configured to maintain a data track, manage and execute data transfers and other computing operations, and/or execute other functions.

Enterprise user computing device 140 may include one or more computing devices and/or other computer components (e.g., processors, memories, communication interfaces). In addition, enterprise user computing device 140 may be linked to and/or used by a first enterprise user (who may, e.g., be associated with an enterprise organization, such as a financial institution, which may operate data track computing platform 110 and/or one or more other systems and/or devices in computing environment 100).

Like enterprise user computing device 140, enterprise user computing device 150 may include one or more computing devices and/or other computer components (e.g., processors, memories, communication interfaces). In addition, enterprise user computing device 150 may be linked to and/or used by a second enterprise user (who also may, e.g., be associated with the enterprise organization which may operate data track computing platform 110 and/or one or more other systems and/or devices in computing environment 100).

Like enterprise user computing device 140 and enterprise user computing device 150, administrator user computing device 160 may include one or more computing devices and/or other computer components (e.g., processors, memories, communication interfaces). In addition, administrator user computing device 160 may be linked to and/or used by a network administrator or another type of administrative user (who may, e.g., be associated with the enterprise organization which may operate data track computing platform 110 and/or one or more other systems and/or devices in computing environment 100).

Computing environment 100 also may include one or more networks, which may interconnect one or more of data track computing platform 110, data sub-processing computing platform 120, data track computing platform 130, enterprise user computing device 140, enterprise user computing device 150, and administrator user computing device 160. For example, computing environment 100 may include a network 170, which may, for instance, include one or more private networks, public networks, sub-networks, and/or the like, and which may interconnect one or more of data track computing platform 110, data sub-processing computing platform 120, data track computing platform 130, enterprise user computing device 140, enterprise user computing device 150, and administrator user computing device 160.

In one or more arrangements, data sub-processing computing platform 120, enterprise user computing device 140, enterprise user computing device 150, administrator user computing device 160, and/or the other systems included in computing environment 100 may be any type of computing device capable of receiving a user interface, receiving input via the user interface, and communicating the received input to one or more other computing devices. For example, data sub-processing computing platform 120, enterprise user computing device 140, enterprise user computing device 150, administrator user computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data track computing platform 110, data sub-processing computing platform 120, data track computing platform 130, enterprise user computing device 140, enterprise user computing device 150, and administrator user computing device 160 may, in some instances, be special-purpose computing devices configured to perform specific functions.

Figure 1B:
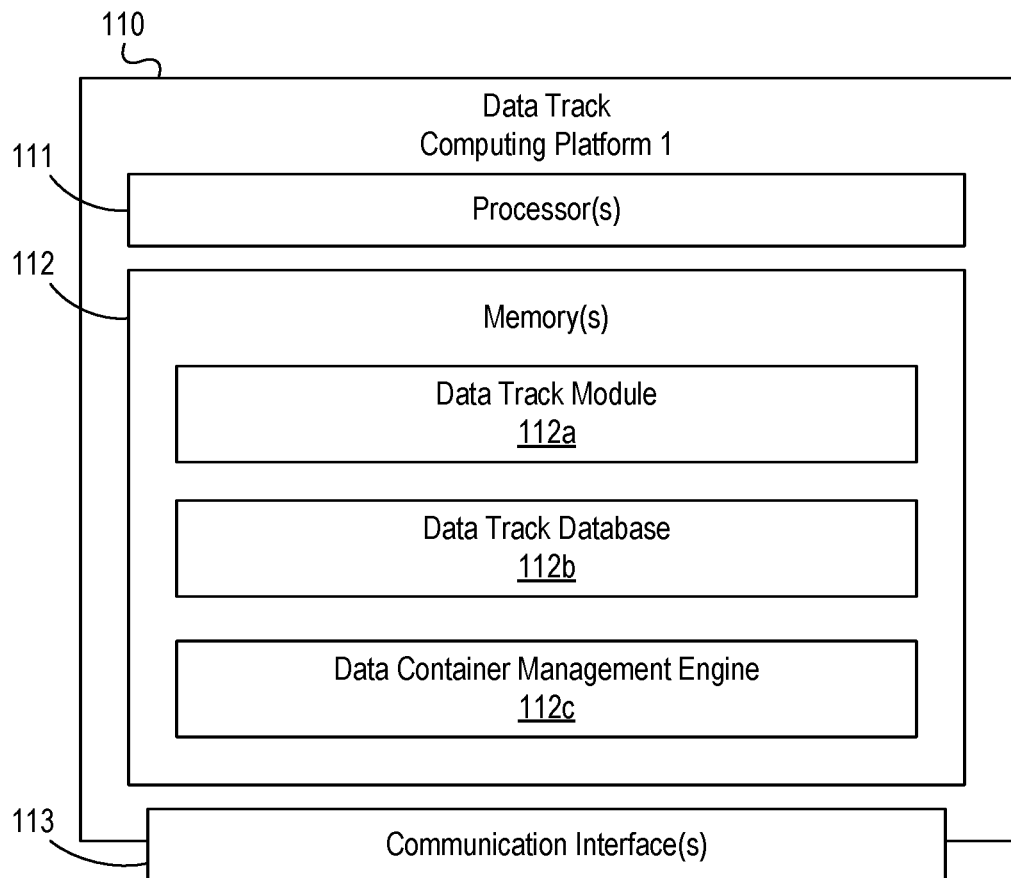

Referring to FIG. 1B, data track computing platform 110 may include one or more processors 111, memory 112, and communication interface 113. A data bus may interconnect processor 111, memory 112, and communication interface 113. Communication interface 113 may be a network interface configured to support communication between data track computing platform 110 and one or more networks (e.g., network 170). Memory 112 may include one or more program modules having instructions that when executed by processor 111 cause data track computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of data track computing platform 110 and/or by different computing devices that may form and/or otherwise make up data track computing platform 110. For example, memory 112 may have, store, and/or include a data track module 112a, a data track database 112b, and a data container management engine 112c. Data track module 112a may have instructions that direct and/or cause data track computing platform 110 to control access to secure information resources using rotational datasets and dynamically configurable data containers, as discussed in greater detail below. Data track database 112b may store information used by data track module 112a and/or data track computing platform 110 in controlling access to secure information resources using rotational datasets and dynamically configurable data containers. Data container management engine 112c may create, configure, and manage one or more data containers, which may be used by data track computing platform 110 in performing various operations, as discussed in greater detail below.

Figure 1C:
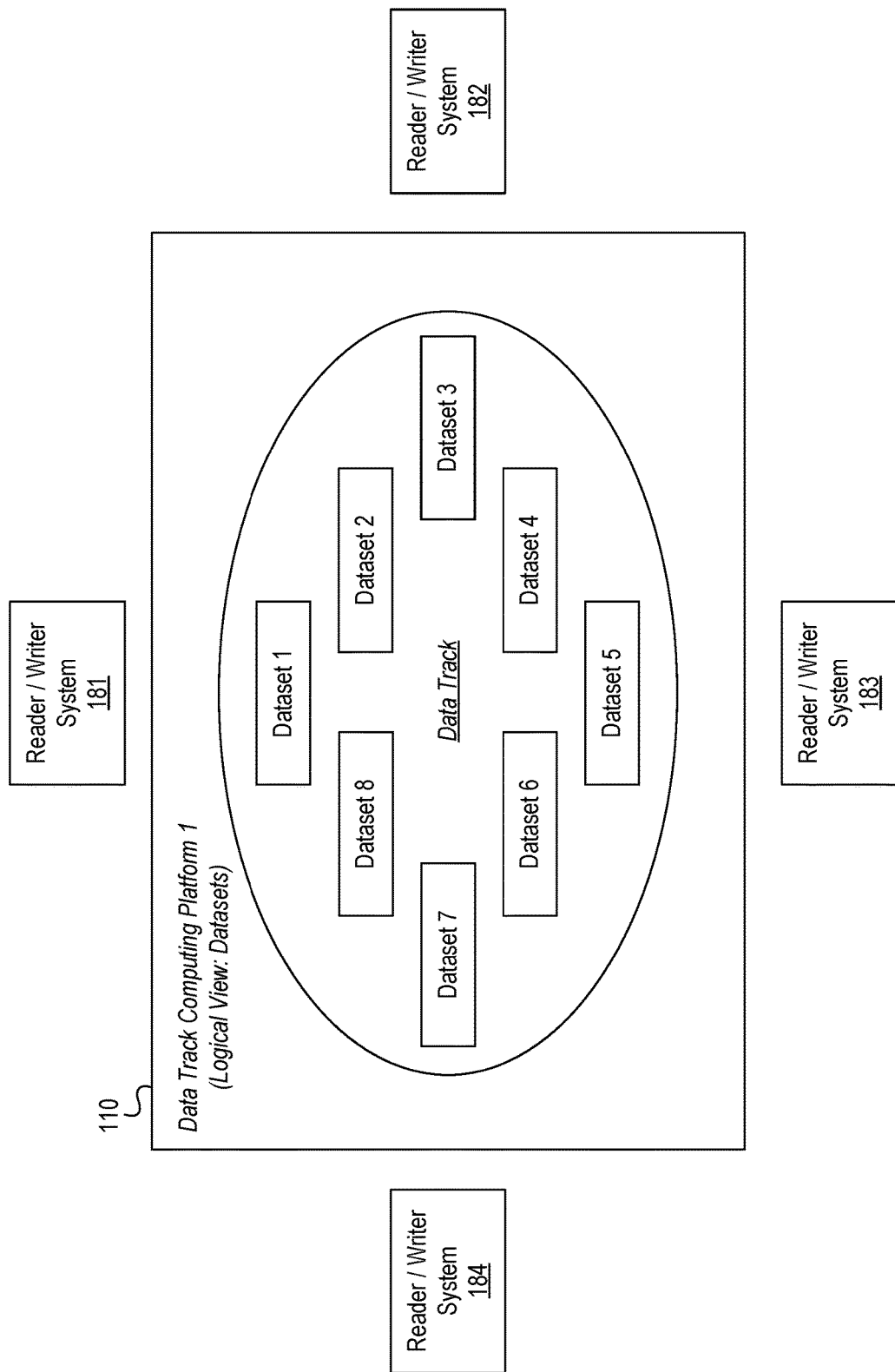

Referring to FIG. 1C, a logical view of datasets stored on a data track maintained by data track computing platform 110 is illustrated. For example, and as discussed in greater detail below, data track computing platform 110 may store a plurality of datasets on a rotatable data track. The contents of the datasets may be extracted and/or otherwise accessed via one or more data containers, which may exist in a layer that sits on top of the data track and which enforce various rules that provide selective access to the contents of the datasets on the underlying data track. In addition, each data container may interface with a single, specific reader-writer system, such as reader-writer system 181, reader-writer system 182, reader-writer system 183, or reader-writer system 184. In one or more embodiments, enterprise user computing device 140, enterprise user computing device 150, and/or other computing devices may correspond to such reader-writer systems. For instance, reader-writer system 181 may correspond to enterprise user computing device 140, and reader-writer system 182 may correspond to enterprise user computing device 150.

Figure 1D:
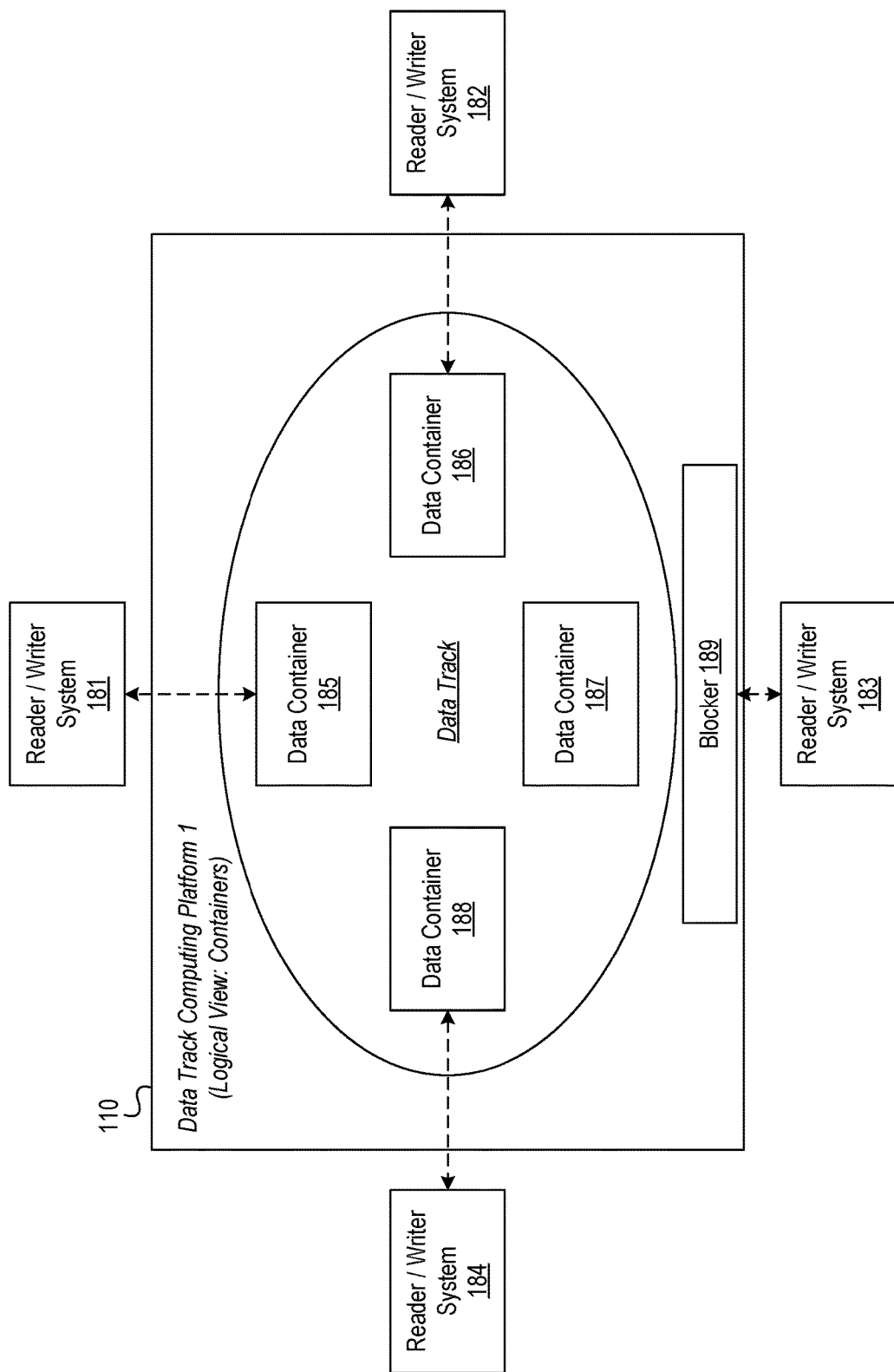

Referring to FIG. 1D, a logical view of the data containers that may interact with the datasets stored on the data track maintained by data track computing platform 110 is illustrated. For example, data container 185, data container 186, data container 187, and data container 188 each may sit on top of a specific dataset stored on the data track maintained by data track computing platform 110. Each data container may enforce one or more rules on its underlying dataset, and different data containers may enforce different rules relative to each other. Each data container also may interface with and/or otherwise interact with a specific reader-writer system. For instance, data container 185 may interface with reader-writer system 181, data container 186 may interface with reader-writer system 182, data container 187 may interface with reader-writer system 183, and data container 188 may interface with reader-writer system 184. In some instances, a blocker may be erected by data track computing platform 110 to prevent access to one or more datasets and/or to deny access to one or more reader-writer systems. For example, a blocker 189 may be erected by data track computing platform 110 to block and/or otherwise prevent reader-writer system 183 from accessing and/or otherwise interacting with data container 187.

Figure 1E:
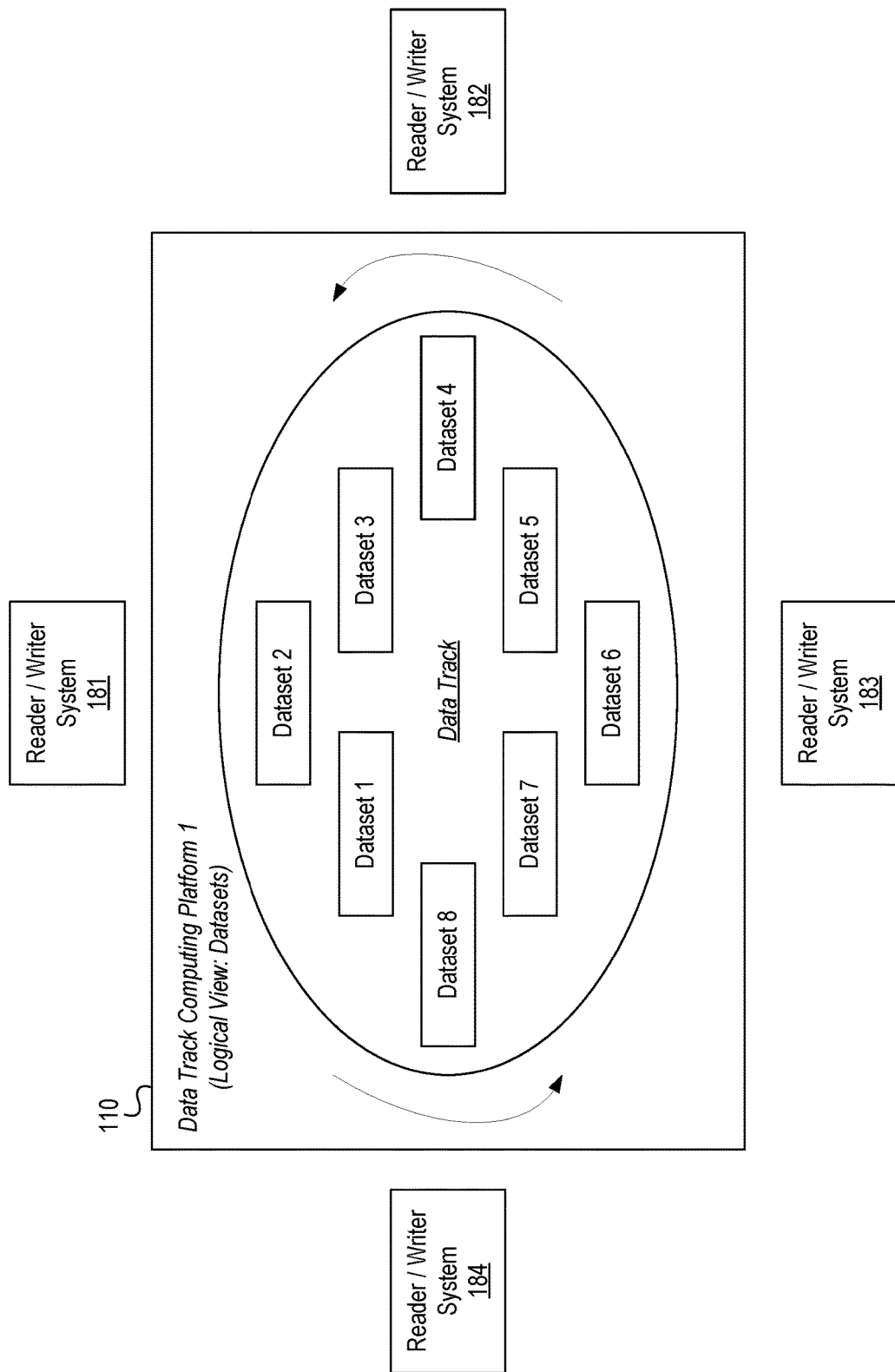

Referring to FIG. 1E, another logical view of the datasets stored on the data track maintained by data track computing platform 110 is illustrated, after the data track has been rotated by data track computing platform 110. As seen in FIG. 1E, the data track maintained by data track computing platform 110 has been rotated such that different datasets may now align with different data containers and different reader-writer systems. Thus, the datasets may now be subject to different access rules (e.g., by virtue of sitting below different data containers, or no data container) and may now be accessible to different reader-writer systems (e.g., by virtue of facing towards different reader-writer systems as a result of the rotation).

Figure 1F:
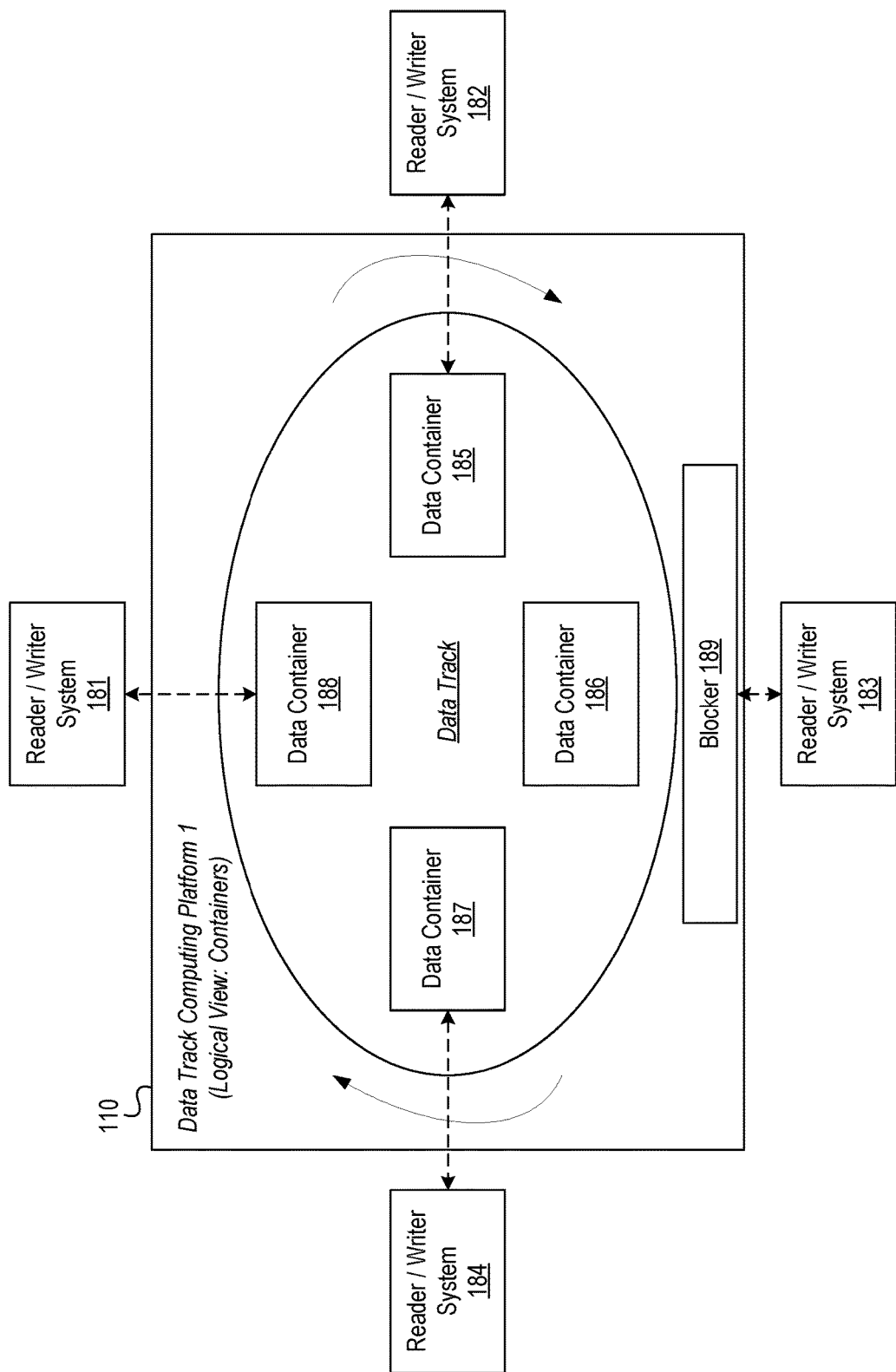

Referring to FIG. 1F, another logical view of the data containers that may interact with the datasets stored on the data track maintained by data track computing platform 110 is illustrated, after the data container layer has been rotated by data track computing platform 110. As seen in FIG. 1F, the data container layer (which may, e.g., sit above the datasets on the data track maintained by data track computing platform 110) has been rotated such that different data containers may now align with different datasets and different reader-writer systems. Thus, the underlying datasets may now be subject to different access rules (e.g., by virtue of sitting below different data containers, or no data container) and may now be accessible to different reader-writer systems (e.g., by virtue of different data containers facing towards different reader-writer systems as a result of the rotation).

Figure 1G:
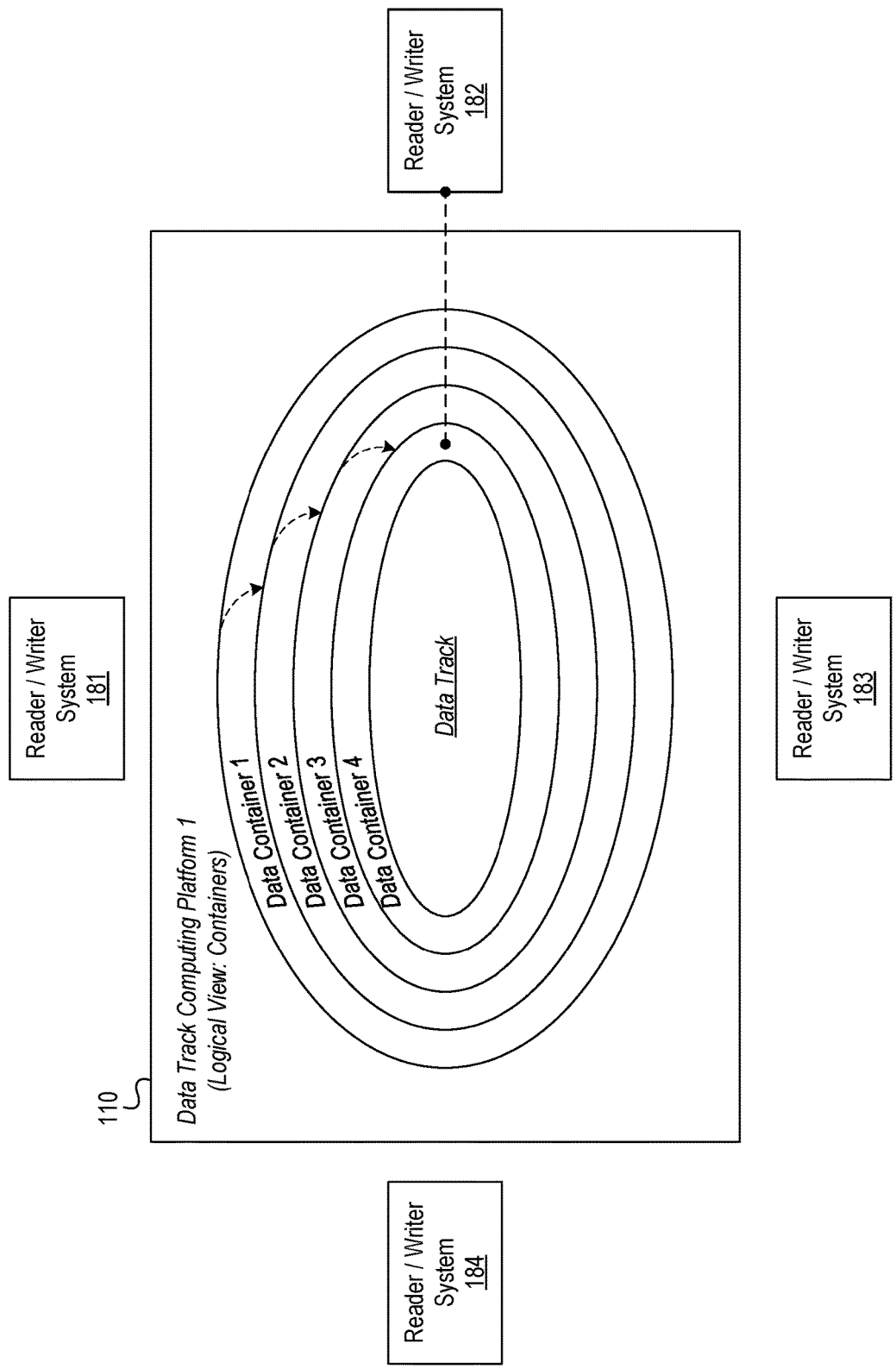

Referring to FIG. 1G, a logical view of an alternative arrangement of data containers that may interact with the datasets stored on the data track maintained by data track computing platform 110 is illustrated. As seen in FIG. 1G, a plurality of data containers may be arranged in a concentric manner, similar to a funnel. In this arrangement, different data containers may interact with each other in sequentially loading contents from different datasets on the underlying data track maintained by data track computing platform 110, as discussed in greater detail below.

Figure 2A:
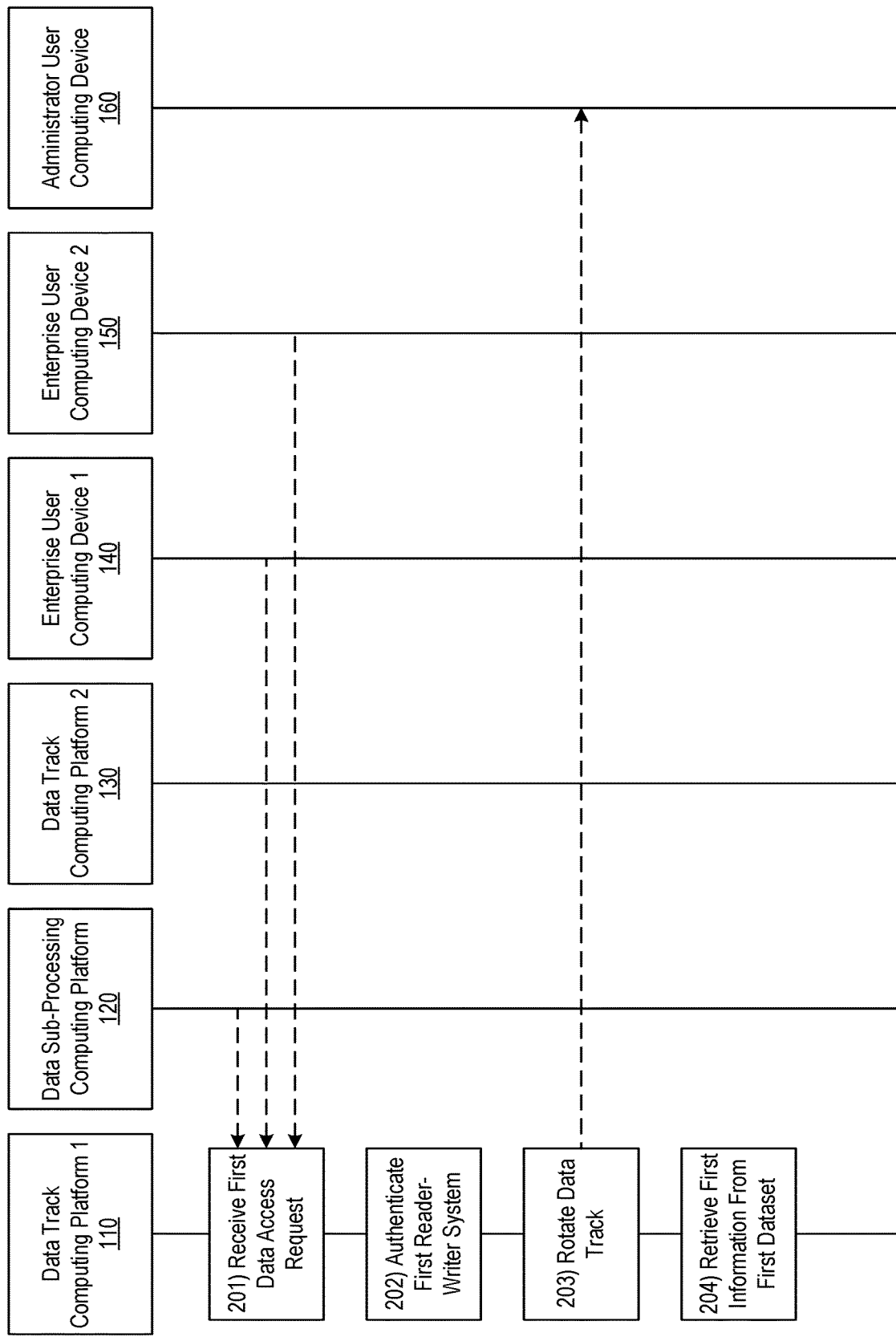

FIGS. 2A-2D depict an illustrative event sequence for controlling access to secure information resources using rotational datasets and dynamically configurable data containers in accordance with one or more example embodiments. Referring to FIG. 2A, at step 201, data track computing platform 110 may receive a first data access request from a reader-writer system (e.g., reader-writer system 181, reader-writer system 182, reader-writer system 183, or reader-writer system 184). For example, at step 201, data track computing platform 110 may receive, via the communication interface (e.g., communication interface 113), from a first reader-writer system (e.g., data sub-processing computing platform 120, enterprise user computing device 140, enterprise user computing device 150), a first data access request.

In some embodiments, receiving the first data access request from the first reader-writer system may include receiving the first data access request from an enterprise user computing device. For example, in receiving the first data access request from the first reader-writer system at step 201, data track computing platform 110 may receive the first data access request from an enterprise user computing device (e.g., enterprise user computing device 140, enterprise user computing device 150).

In some embodiments, receiving the first data access request from the first reader-writer system may include receiving the first data access request from a data sub-processing computing platform that interfaces with an additional data track computing platform which maintains a second data track different from the first data track. For example, in receiving the first data access request from the first reader-writer system at step 201, data track computing platform 110 may receive the first data access request from a data sub-processing computing platform (e.g., data sub-processing computing platform 120) that interfaces with an additional data track computing platform (e.g., data track computing platform 130) which maintains a second data track different from the first data track.

At step 202, data track computing platform 110 may authenticate the first reader-writer system. For example, at step 202, based on receiving the first data access request from the first reader-writer system (e.g., data sub-processing computing platform 120, enterprise user computing device 140, enterprise user computing device 150), data track computing platform 110 may authenticate the first reader-writer system (e.g., data sub-processing computing platform 120, enterprise user computing device 140, enterprise user computing device 150) using a first data container object. For instance, the first data container object (which may, e.g., execute and/or otherwise operate on data track computing platform 110) may authenticate the first reader-writer system (e.g., data sub-processing computing platform 120, enterprise user computing device 140, enterprise user computing device 150) by interrogating and/or validating one or more credentials that are maintained by the reader-writer system and/or provided by the reader-writer system to the first data container object. Additionally or alternatively, the first data container object (which may, e.g., execute and/or otherwise operate on data track computing platform 110) may authenticate the first reader-writer system (e.g., data sub-processing computing platform 120, enterprise user computing device 140, enterprise user computing device 150) based on a unique identifier associated with the first reader-writer system and/or one or more access rules defined for the first data container object and/or maintained by the first data container object. Such access rules may, for instance, define specific systems and/or specific groups of systems that may or may not access the data container object and may be evaluated by data track computing platform 110 in authenticating the first reader-writer system.

Figure 5:
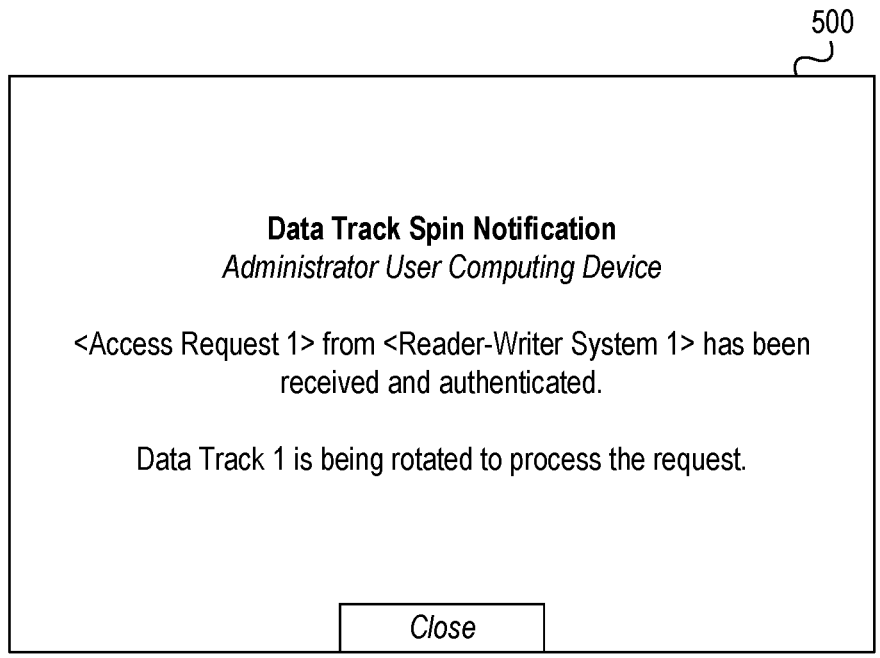
FIGS. 5-8 depict example graphical user interfaces for controlling access to secure information resources using rotational datasets and dynamically configurable data containers in accordance with one or more example embodiments.

At step 203, data track computing platform 110 may rotate the data track. For example, at step 203, after authenticating the first reader-writer system (e.g., data sub-processing computing platform 120, enterprise user computing device 140, enterprise user computing device 150) using the first data container object, data track computing platform 110 may rotate a first data track comprising a plurality of datasets to align a first dataset of the plurality of datasets with the first data container object. For instance, in rotating the first data track, data track computing platform 110 may rotate and/or otherwise circularly move the logical layout of datasets (which may, e.g., be stored on the data track maintained by data track computing platform 110) while maintaining each dataset's spatial relationship to other datasets stored on the data track. For instance, data track computing platform 110 may rotate the data track as illustrated in FIG. 1E. In addition, data track computing platform 110 may align a particular dataset with the data container object that authenticated the reader-writer system (e.g., so as to process the first data access request by retrieving the requested data from the data track). In some instances, in rotating the first data track, data track computing platform 110 may send a notification to administrator user computing device 160, which may cause administrator user computing device 160 to display and/or otherwise present a graphical user interface similar to graphical user interface 500, which is illustrated in FIG. 5. As seen in FIG. 5, graphical user interface 500 may include text and/or other information indicating that the access request has been received and the data track is being rotated (e.g., "<Access Request 1> m <Reader-Writer System 1> has been received and authenticated. Data Track 1 is being rotated to process the request.").

In some embodiments, rotating the first data track comprising the plurality of datasets to align the first dataset of the plurality of datasets with the first data container object may include: identifying the first dataset of the plurality of datasets as having content data corresponding to the first data access request received from the first reader-writer system; and rotating the first data track comprising the plurality of datasets to align the first dataset of the plurality of datasets with the first data container object in response to identifying the first dataset of the plurality of datasets as having the content data corresponding to the first data access request received from the first reader-writer system. For example, in rotating the first data track comprising the plurality of datasets to align the first dataset of the plurality of datasets with the first data container object, data track computing platform 110 may identify the first dataset of the plurality of datasets as having content data corresponding to the first data access request received from the first reader-writer system (e.g., data sub-processing computing platform 120, enterprise user computing device 140, enterprise user computing device 150). For instance, data track computing platform 110 may identify the first dataset of the plurality of datasets as having content data corresponding to the first data access request based on inspecting the contents of the first dataset and/or based on referencing a data table comprising information identifying the contents of the first dataset and/or other datasets. Subsequently, data track computing platform 110 may rotate the first data track comprising the plurality of datasets to align the first dataset of the plurality of datasets with the first data container object in response to identifying the first dataset of the plurality of datasets as having the content data corresponding to the first data access request received from the first reader-writer system (e.g., data sub-processing computing platform 120, enterprise user computing device 140, enterprise user computing device 150).

In some embodiments, the first data container object may enforce a plurality of access rules on the first dataset of the plurality of datasets after the first data track comprising the plurality of datasets is rotated to align the first dataset of the plurality of datasets with the first data container object. For example, the first data container object (which may, e.g., execute and/or otherwise operate on data track computing platform 110) may enforce a plurality of access rules on the first dataset of the plurality of datasets after the first data track comprising the plurality of datasets is rotated to align the first dataset of the plurality of datasets with the first data container object (e.g., by data track computing platform 110 at step 203). For instance, the data container object may enforce read/write rules, security rules, and/or other access rules on the underlying dataset.

In some embodiments, the plurality of access rules enforced on the first dataset of the plurality of datasets by the first data container object may include one or more security-level access rules. For example, data track computing platform 110 may enforce one or more security-level access rules on the first dataset of the plurality of datasets by selectively loading content from the first dataset based on the security level of such content (which may, e.g., be indicated by one or more tags associated with the contents of the first dataset). Such security level tags may, for instance, indicate highly secure data, moderately secure data, and/or non-secure data.

In some embodiments, the plurality of access rules enforced on the first dataset of the plurality of datasets by the first data container object may include one or more content-type access rules. For example, data track computing platform 110 may enforce one or more content-type access rules on the first dataset of the plurality of datasets by selectively loading content from the first dataset based on the content type of such content (which may, e.g., be indicated by one or more tags associated with the contents of the first dataset). Such content-type tags may, for instance, indicate enterprise data, customer data, personally identifying data, and/or unrestricted data.

In some embodiments, rotating the first data track comprising the plurality of datasets to align the first dataset of the plurality of datasets with the first data container object may include rotating a data-container layer comprising the first data container object and at least one additional data container object different from the first data container object. For example, in rotating the first data track comprising the plurality of datasets to align the first dataset of the plurality of datasets with the first data container object at step 203, data track computing platform 110 may rotate a data-container layer comprising the first data container object and at least one additional data container object different from the first data container object. For instance, data track computing platform 110 may rotate the data container layer and its associated data containers as illustrated in FIG. 1F.

At step 204, data track computing platform 110 may retrieve first information from the first dataset. For example, at step 204, after rotating the first data track comprising the plurality of datasets to align the first dataset of the plurality of datasets with the first data container object, data track computing platform 110 may retrieve first information from the first dataset using the first data container object. For instance, data track computing platform 110 may retrieve first information from the first dataset using the first data container object by extracting and/or otherwise loading contents of the first dataset in accordance with one or more access rules imposed on the first dataset by the first data container object and/or by using one or more function calls provided by the first data container object.

Figure 2B:
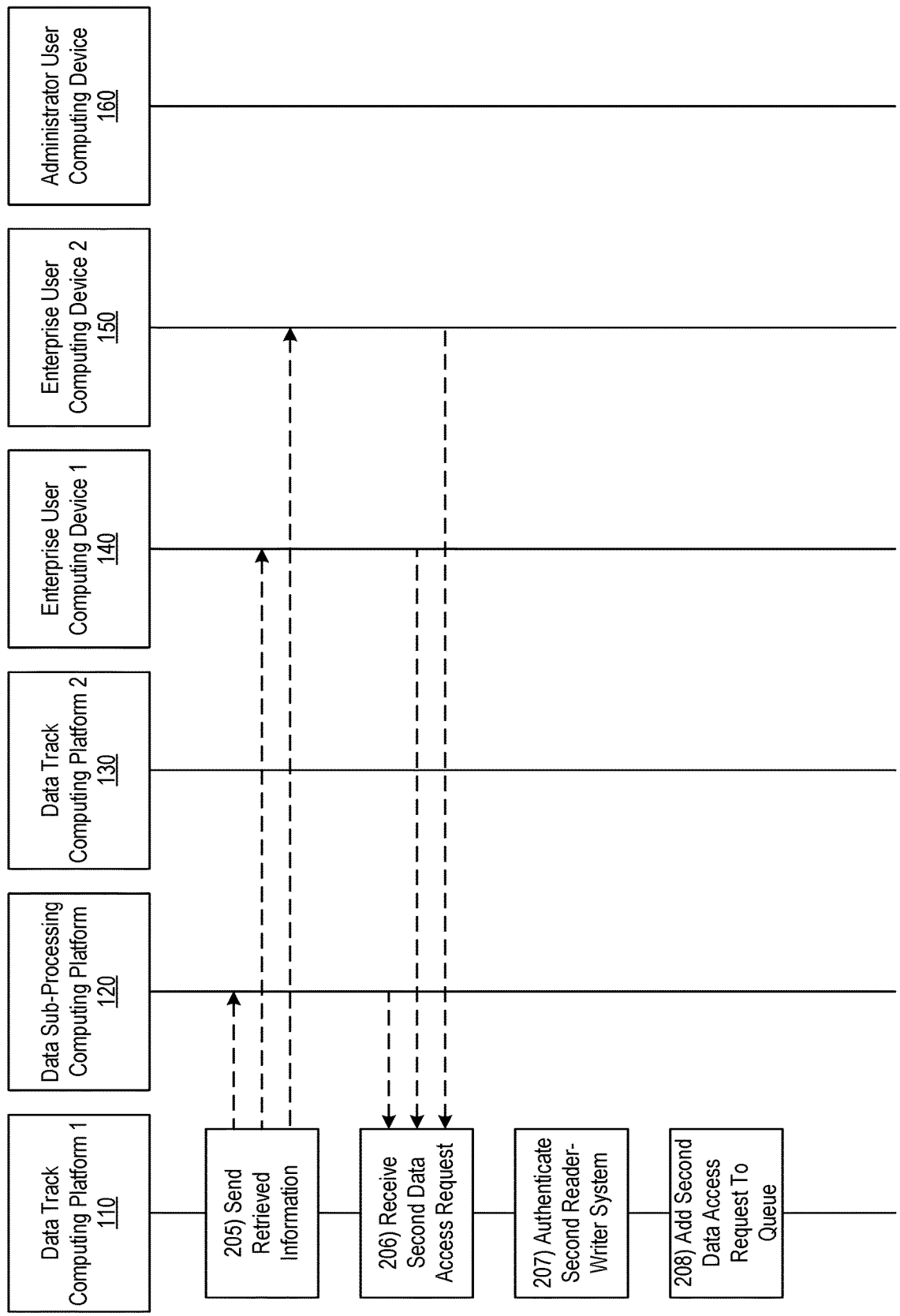

Referring to FIG. 2B, at step 205, data track computing platform 110 may send the retrieved information to the requesting reader-writer system. For example, at step 205, data track computing platform 110 may send, via the communication interface (e.g., communication interface 113), to the first reader-writer system (e.g., data sub-processing computing platform 120, enterprise user computing device 140, enterprise user computing device 150), the first information retrieved from the first dataset using the first data container object. For instance, data track computing platform 110 may send the retrieved information so as to complete processing of the first data access request.

At step 206, data track computing platform 110 may receive a second data access request from a different reader-writer system (e.g., reader-writer system 181, reader-writer system 182, reader-writer system 183, or reader-writer system 184). For example, at step 206, data track computing platform 110 may receive, via the communication interface (e.g., communication interface 113), from a second reader-writer system (e.g., data sub-processing computing platform 120, enterprise user computing device 140, enterprise user computing device 150), a second data access request. For instance, data track computing platform 110 may receive the second data access request similar to how data track computing platform 110 may receive the first data access request, as discussed above.

At step 207, data track computing platform 110 may authenticate the second reader-writer system. For example, at step 207, based on receiving the second data access request from the second reader-writer system (e.g., data sub-processing computing platform 120, enterprise user computing device 140, enterprise user computing device 150), data track computing platform 110 may authenticate the second reader-writer system (e.g., data sub-processing computing platform 120, enterprise user computing device 140, enterprise user computing device 150) using a second data container object. For instance, data track computing platform 110 may authenticate the second reader-writer system similar to how data track computing platform 110 may authenticate the first reader-writer system, as discussed above.

Figure 6:
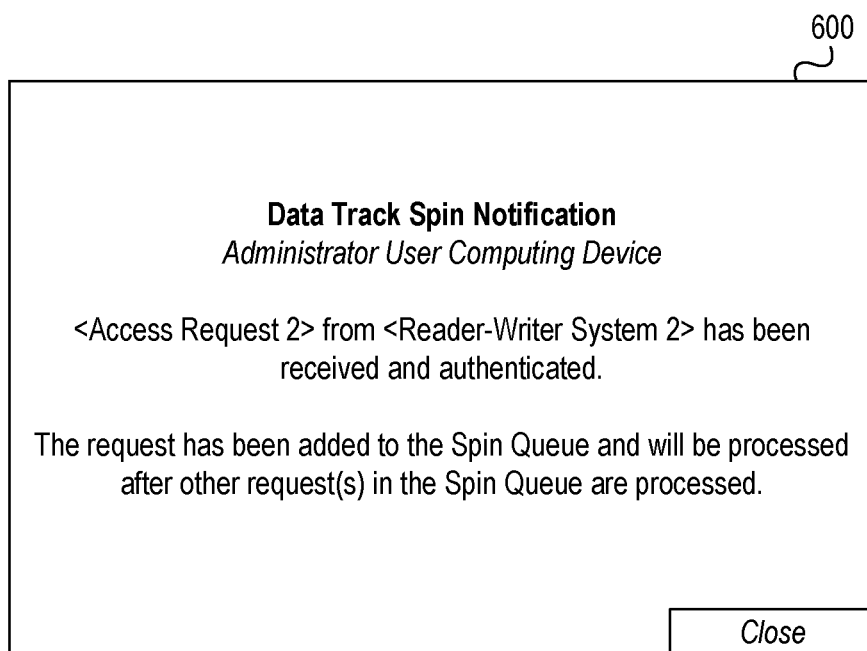

At step 208, data track computing platform 110 may add the second data access request to a queue of data access requests waiting to be processed by data track computing platform 110. For example, at step 208, after authenticating the second reader-writer system using the second data container object, data track computing platform 110 may add the second data access request to a queue of data access requests to be executed. In some instances, in adding the second data access request to the queue of data access requests to be executed, data track computing platform 110 may send a notification to administrator user computing device 160, which may cause administrator user computing device 160 to display and/or otherwise present a graphical user interface similar to graphical user interface 600, which is illustrated in FIG. 6. As seen in FIG. 6, graphical user interface 600 may include text and/or other information indicating that the access request has been received and added to the queue (e.g., "<Access Request 2> from <Reader-Writer System 2> has been received and authenticated. The request has been added to the Spin Queue and will be processed after other request(s) in the Spin Queue are processed.").

Referring to FIG. 2C, at step 209, data track computing platform 110 may rotate the data track (e.g., after completing the first data access request and/or other queued data access requests, when the second data access request is next in the queue). For example, at step 209, when the second data access request reaches an endpoint of the queue of data access requests to be executed, data track computing platform 110 may rotate the first data track comprising the plurality of datasets to align a second dataset of the plurality of datasets with the second data container object. For instance, data track computing platform 110 may rotate the data track to process the second data access request, similar to how data track computing platform 110 may rotate the data track to process the first data access request, as discussed above. In addition, data track computing platform 110 may send a notification to administrator user computing device 160 associated with the rotation of the data track for the second data access request, similar to how data track computing platform 110 may send such a notification to administrator user computing device 160 in processing the first data access request, as discussed above.

At step 210, data track computing platform 110 may retrieve second information from the second dataset on the data track. For example, at step 210, after rotating the first data track comprising the plurality of datasets to align the second dataset of the plurality of datasets with the second data container object, data track computing platform 110 may retrieve second information from the second dataset using the second data container object. For instance, data track computing platform 110 may retrieve second information from the second dataset using the second data container object, similar to how data track computing platform 110 may retrieve first information from the first dataset using the first data container object, as discussed above.

At step 211, data track computing platform 110 may send the second information to the second reader-writer system. For example, at step 211, data track computing platform 110 may send, via the communication interface (e.g., communication interface 113), to the second reader-writer system (e.g., data sub-processing computing platform 120, enterprise user computing device 140, enterprise user computing device 150), the second information retrieved from the second dataset using the second data container object. For instance, data track computing platform 110 may send the second information to the second reader-writer system, similar to how data track computing platform 110 may send the first information to the first reader-writer system, as discussed above.

At step 212, data track computing platform 110 may receive a third data access request from a different reader-writer system (e.g., reader-writer system 181, reader-writer system 182, reader-writer system 183, or reader-writer system 184). For example, at step 212, data track computing platform 110 may receive, via the communication interface (e.g., communication interface 113), from a third reader-writer system (e.g., data sub-processing computing platform 120, enterprise user computing device 140, enterprise user computing device 150), a third data access request. For instance, data track computing platform 110 may receive the third data access request similar to how data track computing platform 110 may receive the first data access request, as discussed above.

Figure 2D:
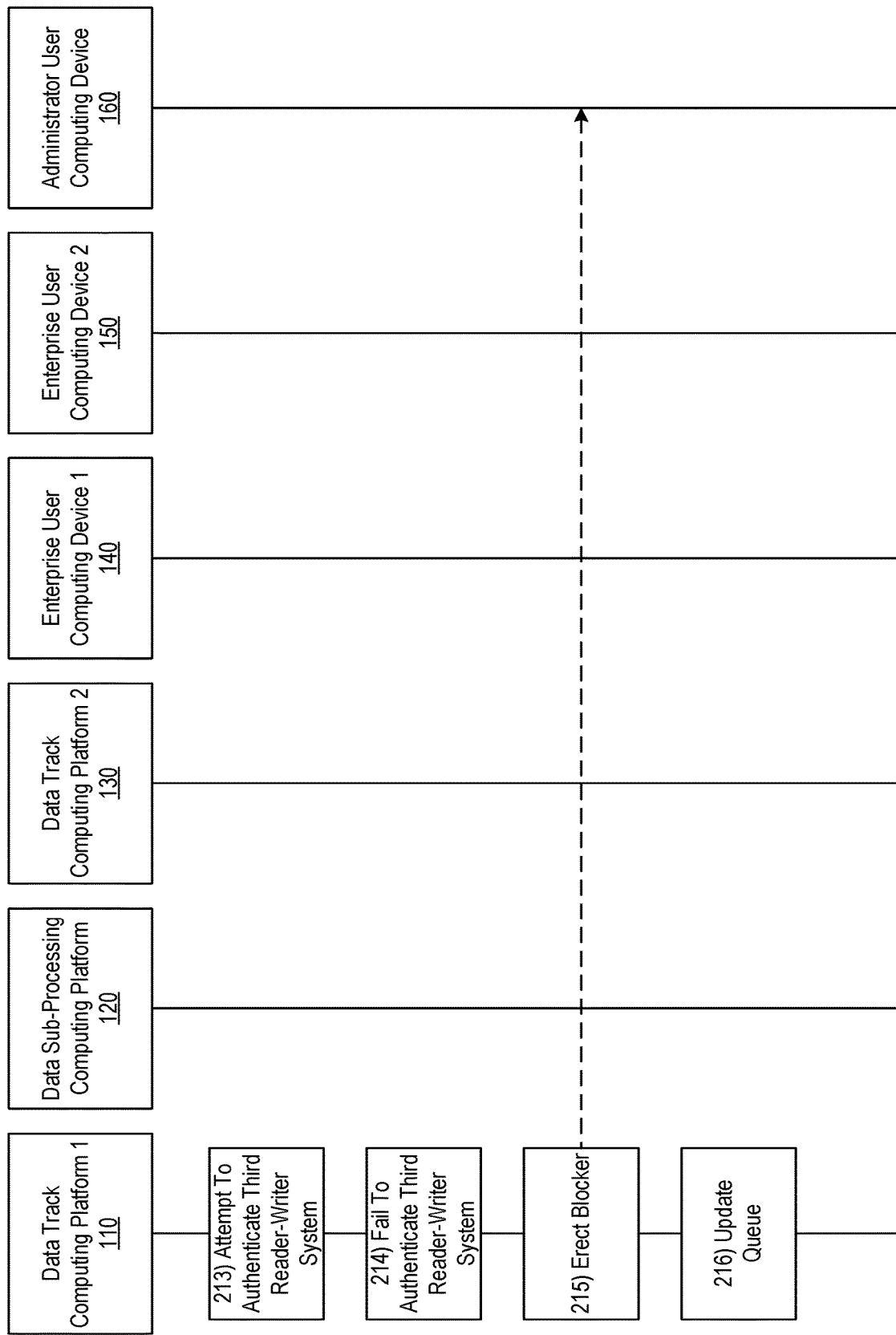

Referring to FIG. 2D, at step 213, data track computing platform 110 may attempt to authenticate the third reader-writer system. For example, at step 213, based on receiving the third data access request from the third reader-writer system (e.g., data sub-processing computing platform 120, enterprise user computing device 140, enterprise user computing device 150), data track computing platform 110 may attempt to authenticate the third reader-writer system (e.g., data sub-processing computing platform 120, enterprise user computing device 140, enterprise user computing device 150) using a third data container object. For instance, data track computing platform 110 may attempt to authenticate the third reader-writer system (e.g., data sub-processing computing platform 120, enterprise user computing device 140, enterprise user computing device 150) using a third data container object by interrogating and/or requesting one or more credentials that are maintained by the reader-writer system and/or provided by the reader-writer system to the third data container object. Additionally or alternatively, the third data container object (which may, e.g., execute and/or otherwise operate on data track computing platform 110) may attempt to authenticate the third reader-writer system (e.g., data sub-processing computing platform 120, enterprise user computing device 140, enterprise user computing device 150) based on a unique identifier associated with the third reader-writer system and/or one or more access rules defined for the third data container object and/or maintained by the third data container object. Such access rules may, for instance, define specific systems and/or specific groups of systems that may or may not access the data container object and may be evaluated by data track computing platform 110 in authenticating the third reader-writer system.

At step 214, data track computing platform 110 may fail to authenticate the third reader-writer system (e.g., data sub-processing computing platform 120, enterprise user computing device 140, enterprise user computing device 150). For example, at step 214, data track computing platform 110 may determine that one or more credentials that are maintained by the reader-writer system and/or provided by the reader-writer system to the third data container object are invalid. Additionally or alternatively, the third data container object (which may, e.g., execute and/or otherwise operate on data track computing platform 110) may determine that the third reader-writer system (e.g., data sub-processing computing platform 120, enterprise user computing device 140, enterprise user computing device 150) is not entitled to access the third data container object based on a unique identifier associated with the third reader-writer system and/or one or more access rules defined for the third data container object and/or maintained by the third data container object.

Figure 7:
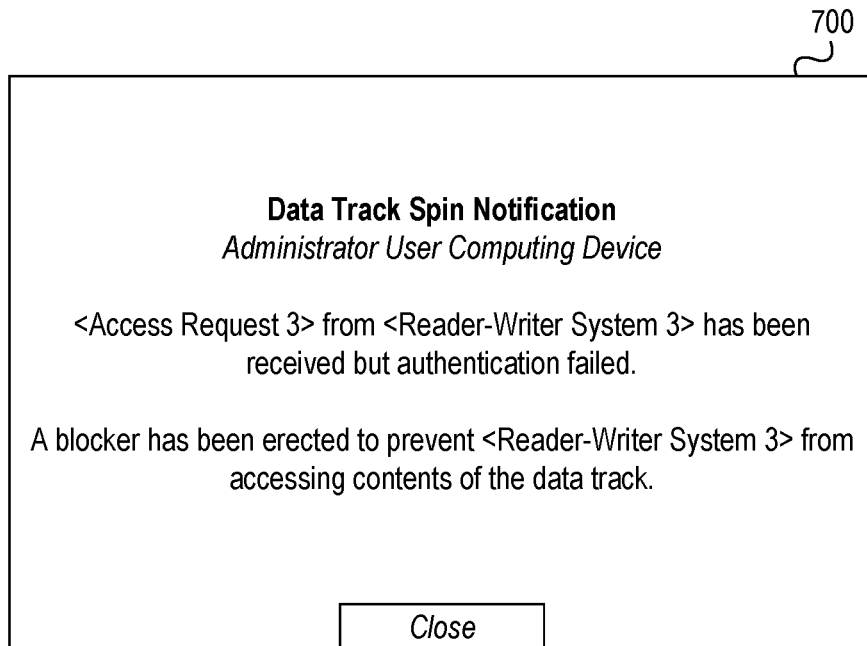

At step 215, data track computing platform 110 may erect a blocker (e.g., to prevent the third reader-writer system from accessing the third data container object and/or the dataset sitting beneath the third data container object). For example, at step 215, based on failing to authenticate the third reader-writer system (e.g., data sub-processing computing platform 120, enterprise user computing device 140, enterprise user computing device 150) using the third data container object, data track computing platform 110 may erect a blocker object between the third data container object and the third reader-writer system (e.g., data sub-processing computing platform 120, enterprise user computing device 140, enterprise user computing device 150). In some instances, in erecting such a blocker, data track computing platform 110 may generate and/or otherwise instantiate a blocker object in memory that prevents such access. Additionally or alternatively, data track computing platform 110 may send a notification to administrator user computing device 160, which may cause administrator user computing device 160 to display and/or otherwise present a graphical user interface similar to graphical user interface 700, which is illustrated in FIG. 7. As seen in FIG. 7, graphical user interface 700 may include text and/or other information indicating that authentication of the third reader-writer system has failed and a blocker has been erected (e.g., "<Access Request 3> from <Reader-Writer System 3> has been received but authentication failed. A blocker has been erected to prevent <Reader-Writer System 3> from accessing contents of the data track.").

At step 216, data track computing platform 110 may update the queue of data access requests to be processed. For example, at step 216, data track computing platform 110 may update the queue to indicate that the third data access request has been denied and that the next data access request in the queue should be processed. Subsequently, data track computing platform 110 may continue to receive and process data access requests from the same and/or other reader-writer systems, similar to how data track computing platform 110 may process such requests in the examples described above. In some instances, such requests may involve a reader-writer system loading information from the data track, writing information to the data track, and/or performing other operations associated with data stored on the data track (e.g., by interacting with one or more data container objects) as in the examples described above.

Figure 3A:
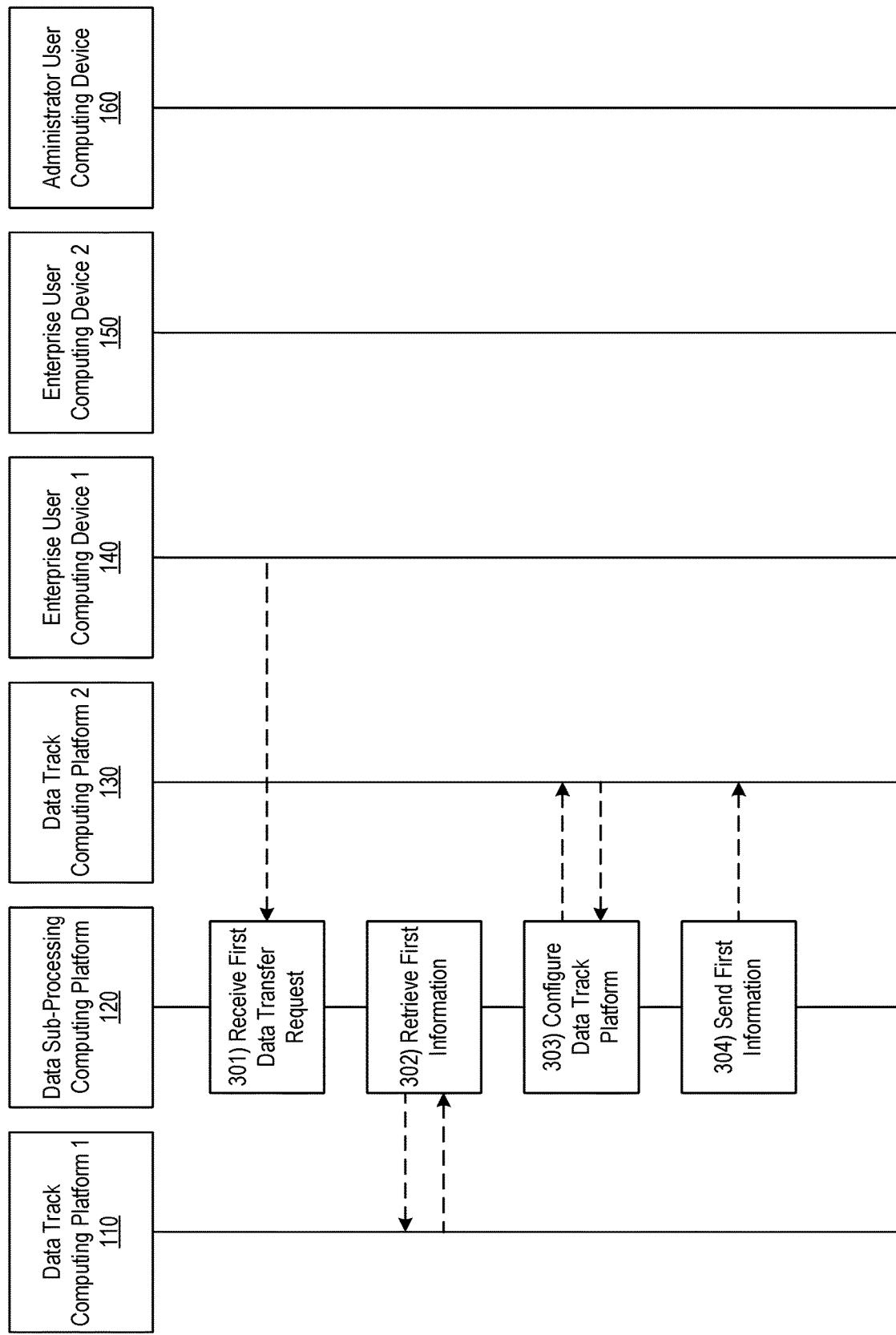
FIGS. 3A-3C depict another illustrative event sequence for controlling access to secure information resources using rotational datasets and dynamically configurable data containers in accordance with one or more example embodiments.
Figure 3B:
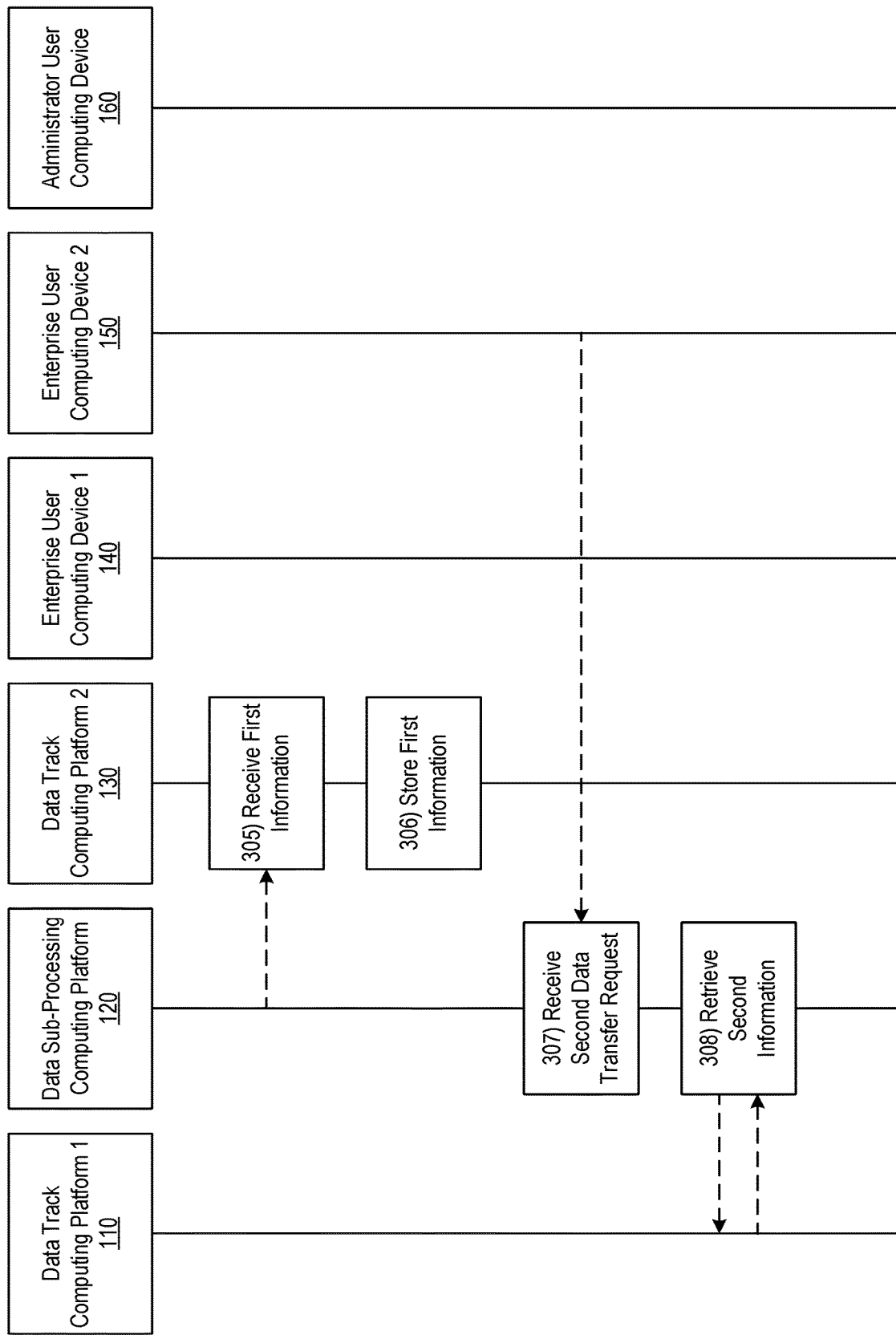
Figure 3C:
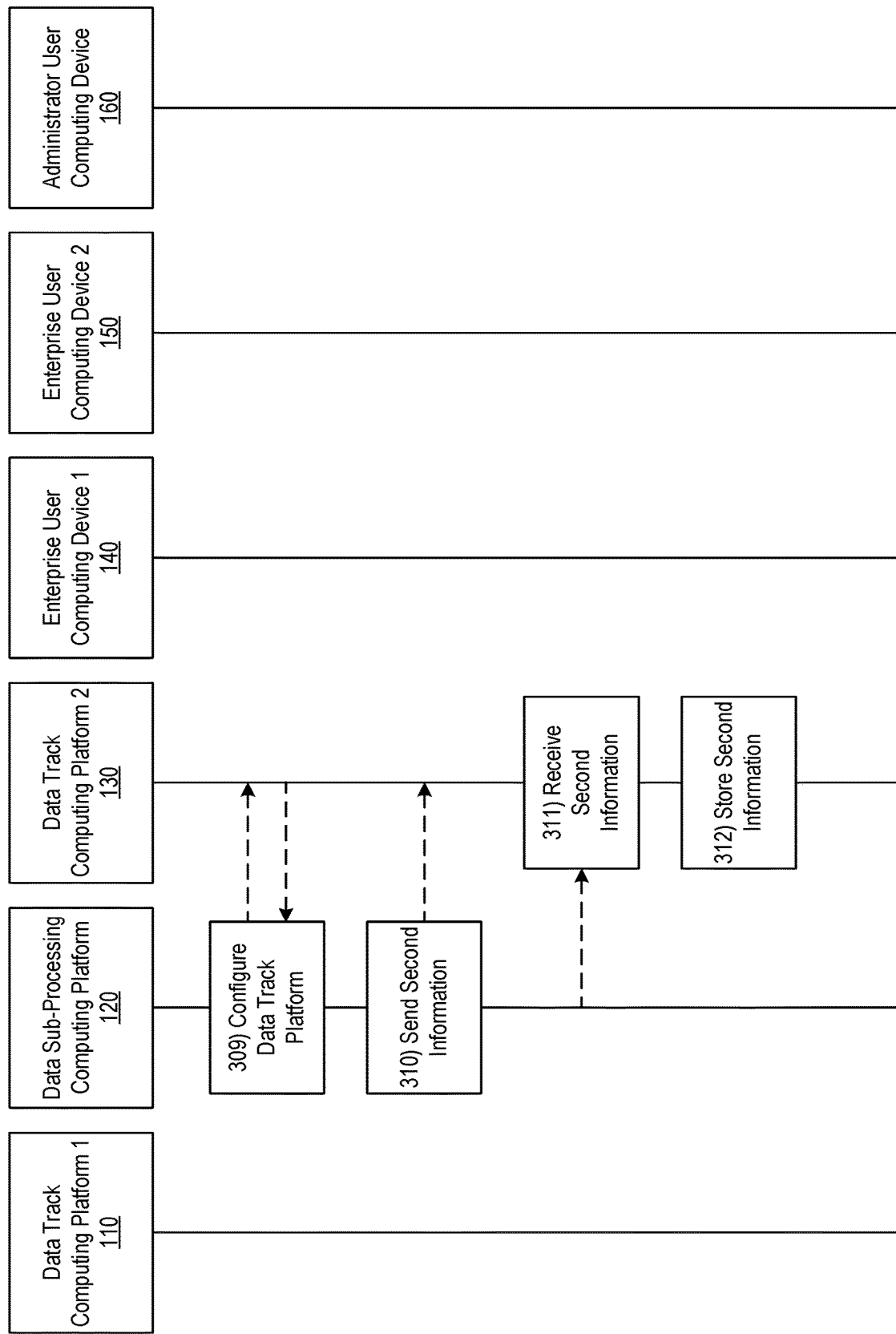

FIGS. 3A-3C depict another illustrative event sequence for controlling access to secure information resources using rotational datasets and dynamically configurable data containers in accordance with one or more example embodiments. As discussed in greater detail below, the example event sequence illustrated in FIGS. 3A-3C shows how information may be transferred from one data track computing platform to another data track computing platform. Referring to FIG. 3A, at step 301, data sub-processing computing platform 120 may receive a first data transfer request from enterprise user computing device 140. For example, at step 301, data sub-processing computing platform 120 may receive, via the communication interface (e.g., communication interface 113), from a first enterprise user computing device (e.g., enterprise user computing device 140), a first data transfer request comprising information scheduling a first data transfer operation.

In some embodiments, receiving the first data transfer request from the first enterprise user computing device may include receiving information scheduling a one-time archival operation. For example, in receiving the first data transfer request from the first enterprise user computing device (e.g., enterprise user computing device 140) at step 301, data sub-processing computing platform 120 may receive information scheduling a one-time archival operation from enterprise user computing device 140.

In some embodiments, receiving the first data transfer request from the first enterprise user computing device may include receiving information scheduling a periodic archival operation. For example, in receiving the first data transfer request from the first enterprise user computing device (e.g., enterprise user computing device 140) at step 301, data sub-processing computing platform 120 may receive information scheduling a periodic archival operation from enterprise user computing device 140. Such a periodic archival operation may, for instance, be executed on data sub-processing computing platform 120 in accordance with the information received from enterprise user computing device 140, such that data stored on a first data track maintained by data track computing platform 110 is archived, backed up, and/or otherwise stored by data sub-processing computing platform 120 on a second data track maintained by data track computing platform 130.

At step 302, data sub-processing computing platform 120 may retrieve first information from data track computing platform 110 (e.g., by sending a data access request to data track computing platform 110, as in the examples described above). For example, at step 302, based on receiving the first data transfer request from the first enterprise user computing device (e.g., enterprise user computing device 140), data sub-processing computing platform 120 may retrieve first information from a first data track computing platform (e.g., data track computing platform 110).

In some embodiments, retrieving the first information from the first data track computing platform may include: generating one or more first rotation commands for the first data track computing platform; and sending the one or more first rotation commands generated for the first data track computing platform to the first data track computing platform. For example, in retrieving the first information from the first data track computing platform (e.g., data track computing platform 110) at step 302, data sub-processing computing platform 120 may generate one or more first rotation commands for the first data track computing platform (e.g., data track computing platform 110). For instance, data sub-processing computing platform 120 may generate one or more first rotation commands for data track computing platform 110, which may direct and/or cause data track computing platform 110 to rotate a data track being maintained by data track computing platform 110, as in the examples described above. Subsequently, data sub-processing computing platform 120 may send the one or more first rotation commands generated for the first data track computing platform (e.g., data track computing platform 110) to the first data track computing platform (e.g., data track computing platform 110). For instance, data sub-processing computing platform 120 may send the one or more first rotation commands to data track computing platform 110 to facilitate retrieval of the requested information from the data track via an appropriate data container, as in the examples described above.

In some embodiments, sending the one or more first rotation commands generated for the first data track computing platform to the first data track computing platform may cause the first data track computing platform to rotate a first data track maintained by the first data track computing platform. In addition, the first data track maintained by the first data track computing platform may include a plurality of datasets, and sending the one or more first rotation commands generated for the first data track computing platform to the first data track computing platform may cause the first data track computing platform to rotate the first data track to align a first dataset of the plurality of datasets with a first data container object. For example, by sending the one or more first rotation commands generated for the first data track computing platform (e.g., data track computing platform 110) to the first data track computing platform (e.g., data track computing platform 110) at step 302, data sub-processing computing platform 120 may cause the first data track computing platform (e.g., data track computing platform 110) to rotate a first data track maintained by the first data track computing platform (e.g., data track computing platform 110), similar to how data track computing platform 110 may rotate a data track as in the examples described above. In addition, the first data track maintained by the first data track computing platform (e.g., data track computing platform 110) may include a plurality of datasets, and by sending the one or more first rotation commands generated for the first data track computing platform (e.g., data track computing platform 110) to the first data track computing platform (e.g., data track computing platform 110), data sub-processing computing platform 120 may cause the first data track computing platform (e.g., data track computing platform 110) to rotate the first data track to align a first dataset of the plurality of datasets with a first data container object. For instance, data sub-processing computing platform 120 may cause data track computing platform 110 to rotate the first data track to align a first dataset of the plurality of datasets with a first data container object based on the first dataset of the plurality of datasets storing and/or otherwise having content data corresponding to the first data transfer request received from the first enterprise user computing device (e.g., enterprise user computing device 140).

In some embodiments, sending the one or more first rotation commands generated for the first data track computing platform to the first data track computing platform may cause the first data track computing platform to rotate a data-container layer comprising the first data container object and at least one additional data container object different from the first data container object. For example, by sending the one or more first rotation commands generated for the first data track computing platform (e.g., data track computing platform 110) to the first data track computing platform (e.g., data track computing platform 110) at step 302, data sub-processing computing platform 120 may cause the first data track computing platform (e.g., data track computing platform 110) to rotate a data-container layer comprising the first data container object and at least one additional data container object different from the first data container object, similar to how data track computing platform 110 may rotate a data-container layer as in the examples described above.

Figure 8:
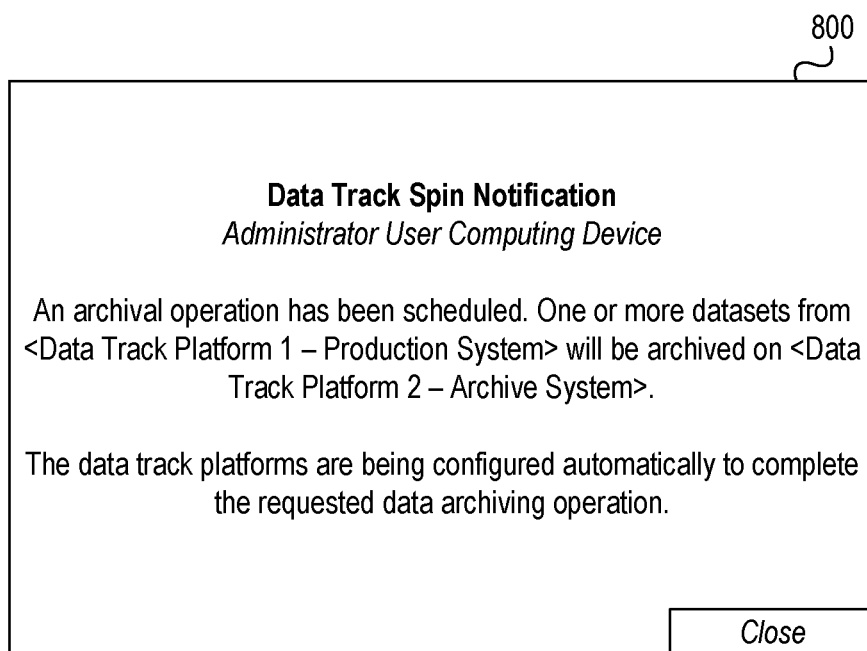

At step 303, data sub-processing computing platform 120 may configure data track computing platform 130. For example, at step 303, data sub-processing computing platform 120 may configure a second data track computing platform (e.g., data track computing platform 130) to receive the first information retrieved from the first data track computing platform (e.g., data track computing platform 110). For instance, data sub-processing computing platform 120 may configure data track computing platform 130 so as to synchronize production content obtained from data track computing platform 110 with archival content maintained on data track computing platform 130. In some instances, in configuring the second data track computing platform (e.g., data track computing platform 130), data sub-processing computing platform 120 may send a notification to administrator user computing device 160, which may cause administrator user computing device 160 to display and/or otherwise present a graphical user interface similar to graphical user interface 800, which is illustrated in FIG. 8. As seen in FIG. 8, graphical user interface 800 may include text and/or other information indicating that an archival operation has been scheduled and/or that various data track computing platforms are being configured by data sub-processing computing platform 120 (e.g., "An archival operation has been scheduled. One or more datasets from <Data Track Platform 1—Production System> will be archived on <Data Track Platform 2—Archive System>. The data track platforms are being configured automatically to complete the requested data archiving operation.").

In some embodiments, configuring the second data track computing platform to receive the first information retrieved from the first data track computing platform may include: generating one or more second rotation commands for the second data track computing platform; and sending the one or more second rotation commands generated for the second data track computing platform to the second data track computing platform. For example, in configuring the second data track computing platform (e.g., data track computing platform 130) to receive the first information retrieved from the first data track computing platform (e.g., data track computing platform 110) at step 303, data sub-processing computing platform 120 may generate one or more second rotation commands for the second data track computing platform (e.g., data track computing platform 130). For instance, data sub-processing computing platform 120 may generate one or more second rotation commands for data track computing platform 130, which may direct and/or cause data track computing platform 130 to rotate a data track being maintained by data track computing platform 130, as in the examples described above. Subsequently, data sub-processing computing platform 120 may send the one or more second rotation commands generated for the second data track computing platform (e.g., data track computing platform 130) to the second data track computing platform (e.g., data track computing platform 130). For instance, data sub-processing computing platform 120 may send the one or more second rotation commands to data track computing platform 130 to facilitate an archival process in which the information obtained from data track computing platform 110 is archived on and/or otherwise written to the data track maintained by data track computing platform 130 via an appropriate data container, as in the examples described above.

In some embodiments, generating the one or more second rotation commands for the second data track computing platform may include generating the one or more second rotation commands for the second data track computing platform based on one or more tags associated with the first information retrieved from the first data track computing platform. For example, in generating the one or more second rotation commands for the second data track computing platform (e.g., data track computing platform 130) at step 303, data sub-processing computing platform 120 may generate the one or more second rotation commands for the second data track computing platform (e.g., data track computing platform 130) based on one or more tags associated with the first information retrieved from the first data track computing platform (e.g., data track computing platform 110). For instance, data sub-processing computing platform 120 may generate the one or more second rotation commands for data track computing platform 130, so as to direct and/or cause data track computing platform 130 to rotate its data track to write data to the data track via one or more containers with sufficient access rights to comply with security restrictions and/or other restrictions imposed by the one or more tags associated with the first information retrieved from data track computing platform 110. For instance, data track computing platform 110 may have applied security-level tags and/or content-type tags to the data (e.g., based on the user role(s) and/or user line(s) of business that created data, the contents of data, and/or the like), and data sub-processing computing platform 120 may generate the one or more second rotation commands for data track computing platform 130 to comply with restrictions imposed by these tags.

In some embodiments, sending the one or more second rotation commands generated for the second data track computing platform to the second data track computing platform may cause the second data track computing platform to rotate a second data track maintained by the second data track computing platform. For example, by sending the one or more second rotation commands generated for the second data track computing platform (e.g., data track computing platform 130) to the second data track computing platform (e.g., data track computing platform 130), data sub-processing computing platform 120 may cause the second data track computing platform (e.g., data track computing platform 130) to rotate a second data track maintained by the second data track computing platform (e.g., data track computing platform 130). For instance, data track computing platform 130 may maintain a data track (e.g., similar to the data track maintained by data track computing platform 110) and the one or more second rotation commands may cause data track computing platform 130 to rotate this data track (e.g., similar to how data track computing platform 110 may rotate its data track), as in the examples described above.

In some embodiments, sending the one or more second rotation commands generated for the second data track computing platform to the second data track computing platform may cause the second data track computing platform to rotate a data-container layer comprising a plurality of data container objects. For example, by sending the one or more second rotation commands generated for the second data track computing platform (e.g., data track computing platform 130) to the second data track computing platform (e.g., data track computing platform 130), data sub-processing computing platform 120 may cause the second data track computing platform (e.g., data track computing platform 130) to rotate a data-container layer comprising a plurality of data container objects. For instance, data track computing platform 130 may have a data-container layer (e.g., similar to the data-container layer associated with data track computing platform 110), and the one or more second rotation commands may cause data track computing platform 130 to rotate this data-container layer (e.g., similar to how data track computing platform 110 may rotate its data-container layer), as in the examples described above.

At step 304, data sub-processing computing platform 120 may send the first information to data track computing platform 130. For example, at step 304, after configuring the second data track computing platform (e.g., data track computing platform 130) to receive the first information retrieved from the first data track computing platform (e.g., data track computing platform 110), data sub-processing computing platform 120 may send, via the communication interface (e.g., communication interface 113), to the second data track computing platform (e.g., data track computing platform 130), the first information retrieved from the first data track computing platform (e.g., data track computing platform 110). In addition, sending the first information retrieved from the first data track computing platform (e.g., data track computing platform 110) to the second data track computing platform (e.g., data track computing platform 130) may cause the second data track computing platform (e.g., data track computing platform 130) to store the first information retrieved from the first data track computing platform (e.g., data track computing platform 110). For instance, by sending the first information to data track computing platform 130 at step 304, data sub-processing computing platform 120 may cause data track computing platform 130 to archive and/or otherwise store the first information on a data track maintained by data track computing platform 130 (e.g., to complete a data transfer and/or archival operation from data track computing platform 110 to data track computing platform 130). In some instances, data track computing platform 110 may, for example, be a live, production system that may receive, create, and/or process enterprise data throughout the day each day, and data track computing platform 110 may tag any and/or all of this data with tags indicating a security level of the data, a user who created the data, the role of the user who created the data, a line of business within the enterprise associated with the user who created the data, and/or the like. And data track computing platform 130 may, for example, be an archival system that may receive, process, and/or store any and/or all of this data from data track computing platform 110 (e.g., on a data track so as to ensure information security and prevent unauthorized access to resources of these enterprise computer systems).

In some embodiments, sending the first information retrieved from the first data track computing platform to the second data track computing platform may include sending the first information retrieved from the first data track computing platform to the second data track computing platform via a plurality of data filters managed by the computing platform. For example, in sending the first information retrieved from the first data track computing platform (e.g., data track computing platform 110) to the second data track computing platform (e.g., data track computing platform 130) at step 304, data sub-processing computing platform 120 may send the first information retrieved from the first data track computing platform (e.g., data track computing platform 110) to the second data track computing platform (e.g., data track computing platform 130) via a plurality of data filters managed by the computing platform (e.g., data sub-processing computing platform 120). For instance, data sub-processing computing platform 120 may maintain, execute, and/or otherwise be associated with a plurality of different filters (e.g., filter 1, filter 2, filter 3, and so on) and data having a specific tag (e.g., tag 1, tag 2, tag 3, and so on) might only be permitted to pass through a corresponding filter. For instance, orange-tagged data might only be permitted to pass through an orange-data filter, blue-tagged data might only be permitted to pass through a blue-data filter, green-tagged data might only be permitted to pass through a green-data filter, and/or the like. In some instances, the data might be loaded from a source data track into the corresponding filters to facilitate transfer and/or storage on a target data track. Additionally or alternatively, the filters may be re-assignable, such that each filter may be reassigned to process a different type of data after a data transfer process, such as an extract-transfer-load (ETL) process, involving the different data tracks (e.g., maintained by data track computing platform 110 and data track computing platform 130) is completed.

Referring to FIG. 3B, at step 305, data track computing platform 130 may receive the first information from data sub-processing computing platform 120. At step 306, data track computing platform 130 may store the first information received from data sub-processing computing platform 120. For example, at step 306, data track computing platform 130 may store the first information received from data sub-processing computing platform 120 on the data track maintained by data track computing platform 130.

At step 307, data sub-processing computing platform 120 may receive a second data transfer request from enterprise user computing device 150. For example, at step 307, data sub-processing computing platform 120 may receive, via the communication interface (e.g., communication interface 113), from a second enterprise user computing device (e.g., enterprise user computing device 150) different from the first enterprise user computing device (e.g., enterprise user computing device 140), a second data transfer request comprising information scheduling a second data transfer operation. For instance, data sub-processing computing platform 120 may receive the second data transfer request from enterprise user computing device 150, similar to how data sub-processing computing platform 120 may receive the first data transfer request from enterprise user computing device 140.

At step 308, data sub-processing computing platform 120 may retrieve second information from data track computing platform 110. For example, at step 308, based on receiving the second data transfer request from the second enterprise user computing device (e.g., enterprise user computing device 150), data sub-processing computing platform 120 may retrieve second information from the first data track computing platform (e.g., data track computing platform 110). For instance, data sub-processing computing platform 120 may retrieve second information from the first data track computing platform (e.g., data track computing platform 110), similar to how data sub-processing computing platform 120 may retrieve first information from the first data track computing platform (e.g., data track computing platform 110) in the examples discussed above.

Referring to FIG. 3C, at step 309, data sub-processing computing platform 120 may configure data track computing platform 130. For example, at step 309, data sub-processing computing platform 120 may configure the second data track computing platform (e.g., data track computing platform 130) to receive the second information retrieved from the first data track computing platform (e.g., data track computing platform 110). For instance, data sub-processing computing platform 120 may configure data track computing platform 130 to receive the second information, similar to how data sub-processing computing platform 120 may configure data track computing platform 130 to receive the first information in the examples discussed above.

At step 310, data sub-processing computing platform 120 may send the second information to data track computing platform 130. For example, at step 310, after configuring the second data track computing platform (e.g., data track computing platform 130) to receive the second information retrieved from the first data track computing platform (e.g., data track computing platform 110), data sub-processing computing platform 120 may send, via the communication interface (e.g., communication interface 113), to the second data track computing platform (e.g., data track computing platform 130), the second information retrieved from the first data track computing platform (e.g., data track computing platform 110). In addition, sending the second information retrieved from the first data track computing platform (e.g., data track computing platform 110) to the second data track computing platform (e.g., data track computing platform 130) may cause the second data track computing platform (e.g., data track computing platform 130) to store the second information retrieved from the first data track computing platform (e.g., data track computing platform 110).

At step 311, data track computing platform 130 may receive the second information from data sub-processing computing platform 120. At step 312, data track computing platform 130 may store the second information received from data sub-processing computing platform 120. For example, at step 312, data track computing platform 130 may store the second information received from data sub-processing computing platform 120 on the data track maintained by data track computing platform 130.

Figure 4A:
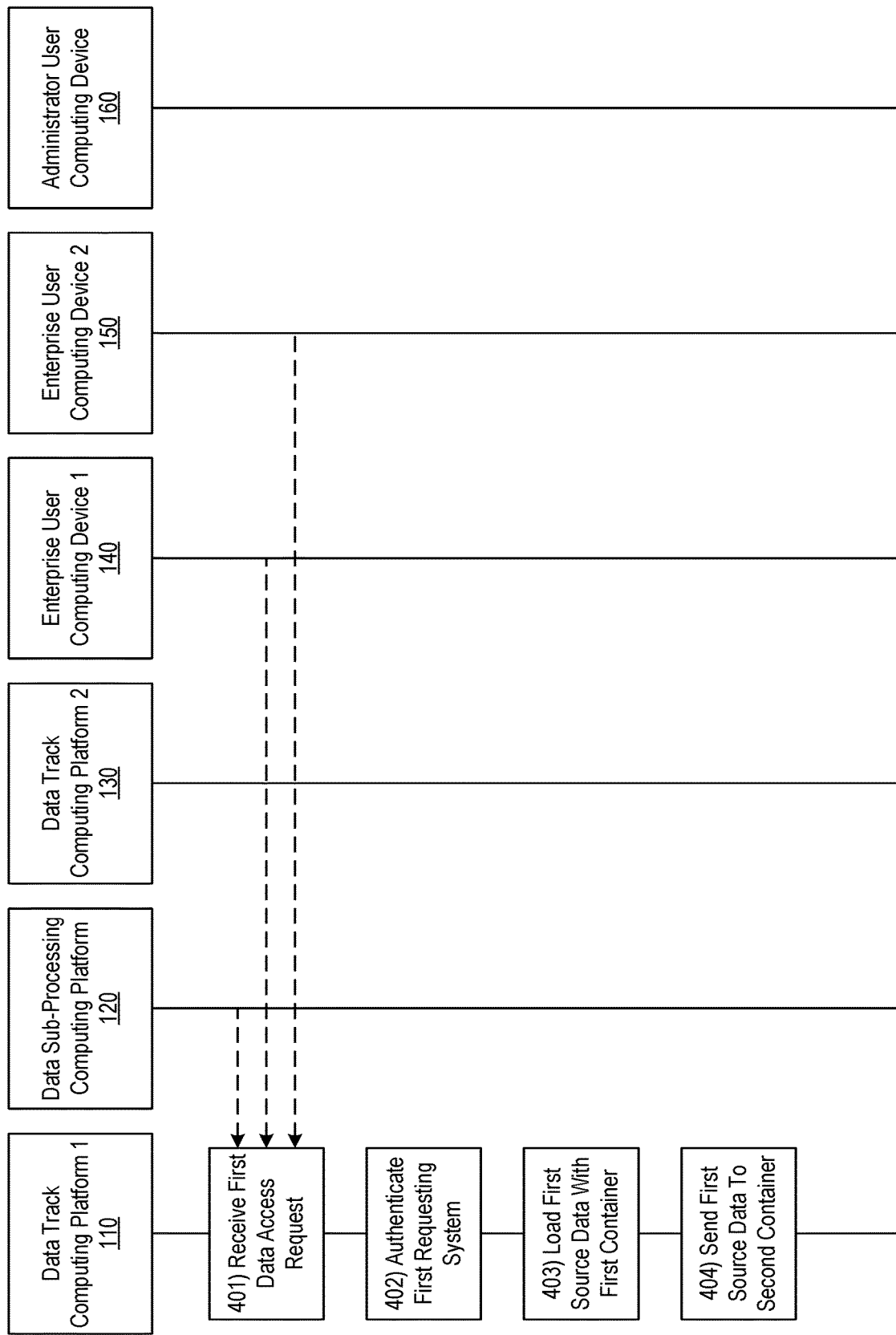
FIGS. 4A-4C depict another illustrative event sequence for controlling access to secure information resources using rotational datasets and dynamically configurable data containers in accordance with one or more example embodiments.
Figure 4B:
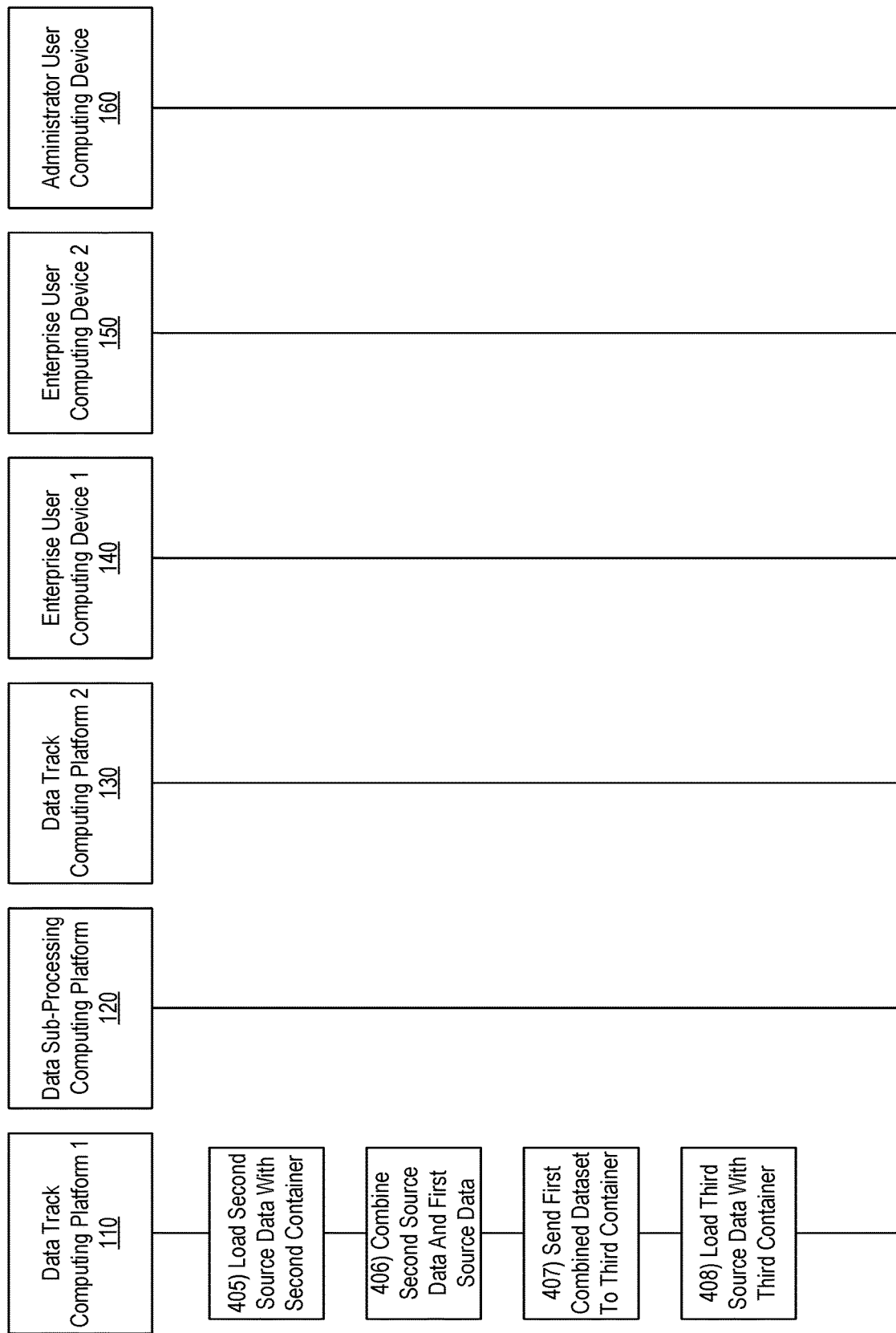
Figure 4C:
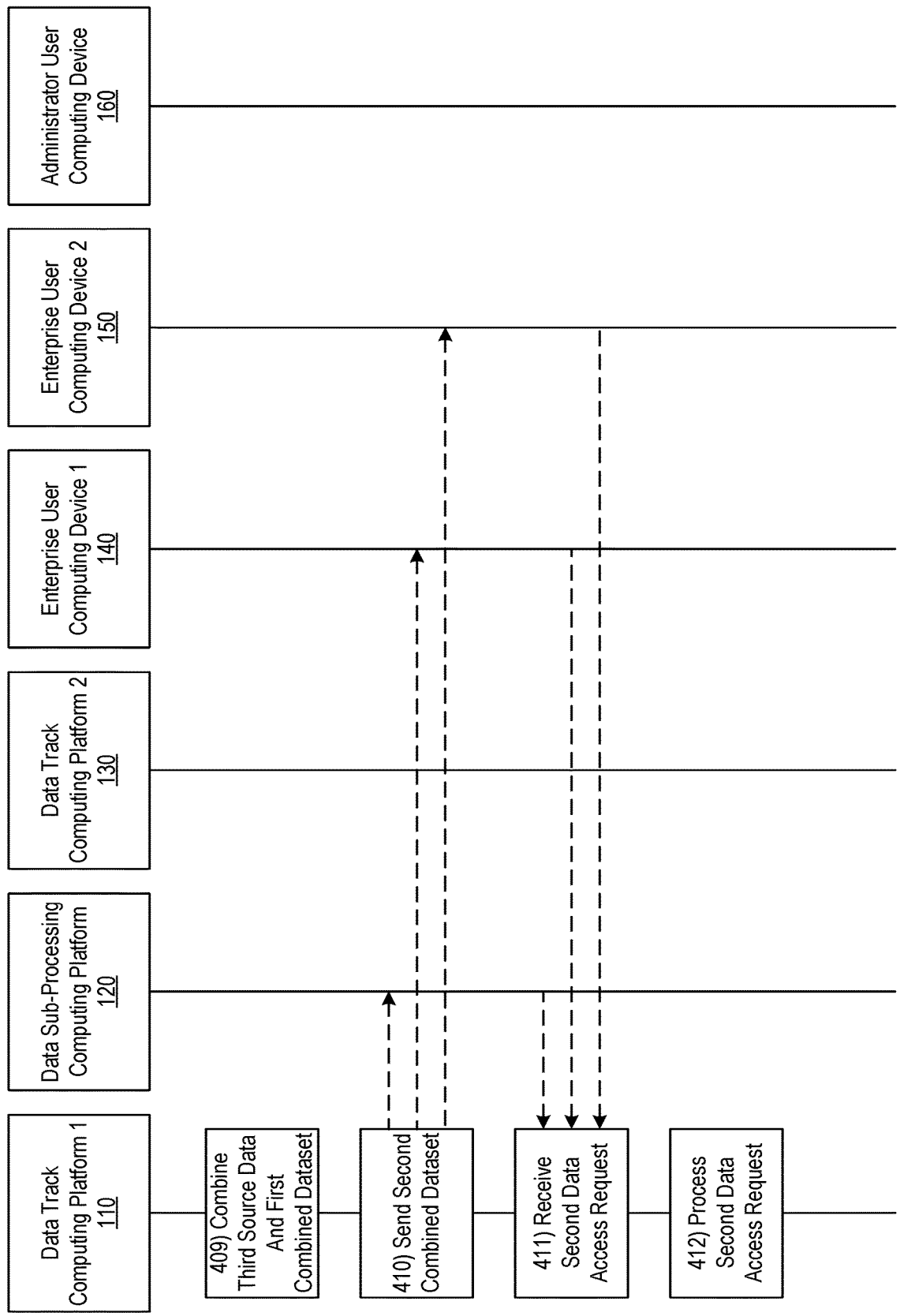

FIGS. 4A-4C depict another illustrative event sequence for controlling access to secure information resources using rotational datasets and dynamically configurable data containers in accordance with one or more example embodiments. Referring to FIG. 4A, at step 401, data track computing platform 110 may receive a first data access request. For example, at step 401, data track computing platform 110 may receive, via the communication interface (e.g., communication interface 113), from a first requesting system (e.g., data sub-processing computing platform 120, enterprise user computing device 140, enterprise user computing device 150), a first data access request. For instance, data track computing platform 110 may receive a data access request, similar to how data track computing platform 110 may receive a data access request as in the examples discussed above.

In some arrangements, the data container layer maintained by data track computing platform 110 in connection with the example event sequence illustrated in FIGS. 4A-4C may resemble the data container layer illustrated in FIG. 1G. In these arrangements, source data may be sent from one data container to the next to facilitate the collection of data to respond to a particular data access request, as discussed below.

In some embodiments, receiving the first data access request from the first requesting system may include receiving the first data access request from a first reader-writer system. For example, in receiving the first data access request from the first requesting system at step 401, data track computing platform 110 may receive the first data access request from a first reader-writer system (e.g., enterprise user computing device 140, enterprise user computing device 150).

In some embodiments, receiving the first data access request from the first requesting system may include receiving the first data access request from a data sub-processing computing platform that interfaces with an additional data track computing platform which maintains a second data track different from the first data track. For example, in receiving the first data access request from the first requesting system at step 401, data track computing platform 110 may receive the first data access request from a data sub-processing computing platform (e.g., data sub-processing computing platform 120) that interfaces with an additional data track computing platform (e.g., data track computing platform 130) which maintains a second data track different from the first data track.

At step 402, data track computing platform 110 may authenticate the first requesting system. For example, at step 402, based on receiving the first data access request from the first requesting system (e.g., data sub-processing computing platform 120, enterprise user computing device 140, enterprise user computing device 150), data track computing platform 110 may authenticate the first requesting system (e.g., data sub-processing computing platform 120, enterprise user computing device 140, enterprise user computing device 150) using a first data container object. For instance, data track computing platform 110 may authenticate the first requesting system (e.g., data sub-processing computing platform 120, enterprise user computing device 140, enterprise user computing device 150) using a first data container object, as in the examples discussed above.

At step 403, data track computing platform 110 may load first source data using the first data container. For example, at step 403, after authenticating the first requesting system (e.g., data sub-processing computing platform 120, enterprise user computing device 140, enterprise user computing device 150) using the first data container object, data track computing platform 110 may load, using the first data container object, first source data from a first data track maintained by the computing platform (e.g., data track computing platform 110). In addition, the first data track maintained by the computing platform (e.g., data track computing platform 110) may include a plurality of datasets. For instance, data track computing platform 110 may maintain a data track as in the examples discussed above, and data track computing platform 110 may load data from the data track, similar to how data track computing platform 110 may load data from a data track in the examples discussed above.

In some embodiments, loading the first source data from the first data track maintained by the computing platform using the first data container object may include rotating the first data track to align a first dataset of the plurality of datasets with the first data container object. For example, in loading the first source data from the first data track maintained by the computing platform (e.g., data track computing platform 110) using the first data container object, data track computing platform 110 may rotate the first data track to align a first dataset of the plurality of datasets with the first data container object. For instance, data track computing platform 110 may rotate its data track, similar to how data track computing platform 110 may rotate a data track in the examples discussed above.

At step 404, data track computing platform 110 may send the first source data to a second data container. For example, at step 404, data track computing platform 110 may send the first source data loaded using the first data container object to a second data container object different from the first data container object. For instance, referring to FIG. 1G, data collected via a first data container (e.g., "Data Container 1") may be sent to a second data container (e.g., "Data Container 2"). As illustrated below, this process may be repeated several times, with several layer of data containers, before a compilation of data is returned to a particular reader-writer system (e.g., reader-writer system 182).

Referring to FIG. 4B, at step 405, data track computing platform 110 may load second source data using the second data container. For example, at step 405, data track computing platform 110 may load, using the second data container object, second source data from the first data track maintained by the computing platform (e.g., data track computing platform 110). For instance, data track computing platform 110 may load source data from the data track, as in the examples described above.

In some embodiments, loading the second source data from the first data track maintained by the computing platform using the second data container object may include loading the second source data from the first data track maintained by the computing platform using the second data container object based on re-authenticating the first requesting system using the second data container object. For example, in loading the second source data from the first data track maintained by the computing platform (e.g., data track computing platform 110) using the second data container object at step 405, data track computing platform 110 may load the second source data from the first data track maintained by the computing platform (e.g., data track computing platform 110) using the second data container object based on re-authenticating the first requesting system (e.g., data sub-processing computing platform 120, enterprise user computing device 140, enterprise user computing device 150) using the second data container object. For instance, data track computing platform 110 may re-authenticate the first requesting system (e.g., data sub-processing computing platform 120, enterprise user computing device 140, enterprise user computing device 150) using a second data container object, similar to how data track computing platform 110 may authenticate the first requesting system (e.g., data sub-processing computing platform 120, enterprise user computing device 140, enterprise user computing device 150) using a first data container object, as in the examples discussed above.

In some embodiments, loading the second source data from the first data track maintained by the computing platform using the second data container object may include rotating the first data track to align a second dataset of the plurality of datasets with the second data container object. For example, in loading the second source data from the first data track maintained by the computing platform (e.g., data track computing platform 110) using the second data container object at step 405, data track computing platform 110 may rotate the first data track to align a second dataset of the plurality of datasets with the second data container object. For instance, data track computing platform 110 may rotate its data track, similar to how data track computing platform 110 may rotate a data track in the examples discussed above.

At step 406, data track computing platform 110 may combine the second source data and the first source data. For example, at step 406, data track computing platform 110 may combine, at the second data container object, the second source data loaded using the second data container object and the first source data loaded using the first data container object to produce a first combined dataset. For instance, in combining the second source data loaded using the second data container object and the first source data loaded using the first data container object, data track computing platform 110 may compile and/or otherwise merge the first data and the second data, which may result in the creation of the first combined dataset.

In some embodiments, combining the second source data loaded using the second data container object and the first source data loaded using the first data container object to produce the first combined dataset may include filtering the second source data loaded using the second data container object and the first source data loaded using the first data container object to remove redundant data. For example, in combining the second source data loaded using the second data container object and the first source data loaded using the first data container object to produce the first combined dataset at step 406, data track computing platform 110 may filter the second source data loaded using the second data container object and the first source data loaded using the first data container object to remove redundant data. For instance, data track computing platform 110 may remove duplicative content from the first combined dataset (which may, e.g., result from overlapping data existing in both the first source data and the second source data).

At step 407, data track computing platform 110 may send the first combined dataset to a third data container. For example, at step 407, data track computing platform 110 may send the first combined dataset to a third data container object different from the first data container object and the second data container object. For instance, data track computing platform 110 may send the first combined dataset to a third data container object, similar to how data track computing platform 110 may send the first source data loaded using the first data container object to the second data container object in the examples described above.

In some embodiments, sending the first combined dataset to the third data container object different from the first data container object and the second data container object may include sending the first combined dataset to the third data container object based on the first data container object having a first ruleset associated with a first data type, the second data container object having a second ruleset associated with a second data type, and the third data container object having a third ruleset associated with a third data type. For example, in sending the first combined dataset to the third data container object different from the first data container object and the second data container object, data track computing platform 110 may send the first combined dataset to the third data container object based on the first data container object having a first ruleset associated with a first data type, the second data container object having a second ruleset associated with a second data type, and the third data container object having a third ruleset associated with a third data type. For instance, each data container may have individual, container-specific rules dictating what types of data the particular data container can read, write, and/or otherwise interact with. For instance, the first data container may have a ruleset that allows for loading of transaction identifiers and transaction amounts from a source data track, the second data container may have a ruleset that allows for loading of account numbers from the source data track, and the third data container may have a ruleset that allows for loading of merchant names from the source data track.

At step 408, data track computing platform 110 may load third source data using the third data container. For example, at step 408, data track computing platform 110 may load, using the third data container object, third source data from the first data track maintained by the computing platform (e.g., data track computing platform 110). For instance, data track computing platform 110 may load source data from the data track, as in the examples described above.

In some embodiments, loading the third source data from the first data track maintained by the computing platform using the third data container object may include loading the third source data from the first data track maintained by the computing platform using the third data container object based on re-authenticating the first requesting system using the third data container object. For example, in loading the third source data from the first data track maintained by the computing platform (e.g., data track computing platform 110) using the third data container object at step 408, data track computing platform 110 may load the third source data from the first data track maintained by the computing platform (e.g., data track computing platform 110) using the third data container object based on re-authenticating the first requesting system (e.g., data sub-processing computing platform 120, enterprise user computing device 140, enterprise user computing device 150) using the third data container object. For instance, data track computing platform 110 may re-authenticate the first requesting system (e.g., data sub-processing computing platform 120, enterprise user computing device 140, enterprise user computing device 150) using the third data container object, similar to how data track computing platform 110 may authenticate the first requesting system (e.g., data sub-processing computing platform 120, enterprise user computing device 140, enterprise user computing device 150) using the first data container object, as in the examples discussed above.

In some embodiments, loading the third source data from the first data track maintained by the computing platform using the third data container object may include rotating the first data track to align a third dataset of the plurality of datasets with the third data container object. For example, in loading the third source data from the first data track maintained by the computing platform (e.g., data track computing platform 110) using the third data container object at step 408, data track computing platform 110 may rotate the first data track to align a third dataset of the plurality of datasets with the third data container object. For instance, data track computing platform 110 may rotate its data track, similar to how data track computing platform 110 may rotate a data track in the examples discussed above.

Referring to FIG. 4C, at step 409, data track computing platform 110 may combine the third source data with the first combined dataset. For example, at step 409, data track computing platform 110 may combine, at the third data container object, the third source data loaded using the third data container object and the first combined dataset to produce a second combined dataset. For instance, in combining the third source data loaded using the third data container object and the first combined dataset, data track computing platform 110 may compile and/or otherwise merge the third data and the first combined dataset, which may result in the creation of the second combined dataset.

In some embodiments, combining the third source data loaded using the third data container object and the first combined dataset to produce the second combined dataset may include filtering the third source data loaded using the third data container object and the first combined dataset to remove redundant data. For example, in combining the third source data loaded using the third data container object and the first combined dataset to produce the second combined dataset at step 409, data track computing platform 110 may filter the third source data loaded using the third data container object and the first combined dataset to remove redundant data. For instance, data track computing platform 110 may remove duplicative content from the second combined dataset (which may, e.g., result from overlapping data existing in both the third source data and the first combined dataset).

At step 410, data track computing platform 110 may send the second combined dataset to the requesting system. For example, at step 410, data track computing platform 110 may send, via the communication interface (e.g., communication interface 113), to the first requesting system (e.g., data sub-processing computing platform 120, enterprise user computing device 140, enterprise user computing device 140), the second combined dataset.

At step 411, data track computing platform 110 may receive a second data access request (e.g., from data sub-processing computing platform 120, enterprise user computing device 140, enterprise user computing device 140). For instance, at step 411, data track computing platform 110 may receive a second data access request, similar to how data track computing platform 110 may receive the first data access request as in the examples described above. At step 412, data track computing platform 110 may process the second data access request. For instance, at step 412, data track computing platform 110 may process the second data access request (e.g., by performing steps similar to those described above in connection with data track computing platform 110 processing the first data access request).

Figure 9:
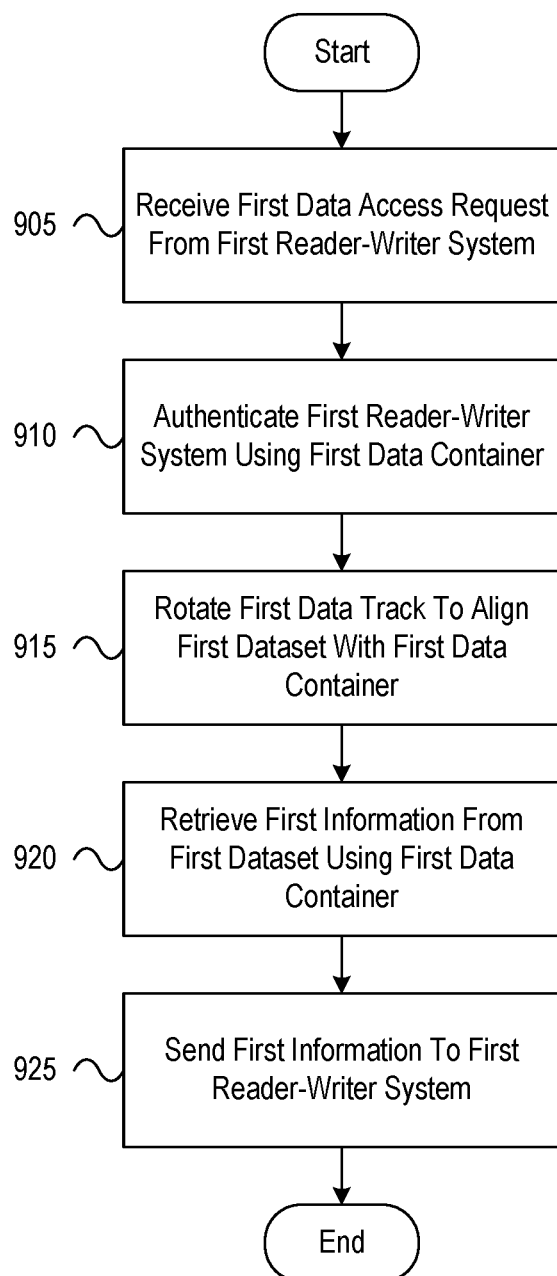
FIG. 9 depicts an illustrative method for controlling access to secure information resources using rotational datasets and dynamically configurable data containers in accordance with one or more example embodiments.

FIG. 9 depicts an illustrative method for controlling access to secure information resources using rotational datasets and dynamically configurable data containers in accordance with one or more example embodiments. Referring to FIG. 9, at step 905, a computing platform having at least one processor, a communication interface, and memory may receive, via the communication interface, from a first reader-writer system, a first data access request. At step 910, based on receiving the first data access request from the first reader-writer system, the computing platform may authenticate the first reader-writer system using a first data container object. At step 915, after authenticating the first reader-writer system using the first data container object, the computing platform may rotate a first data track comprising a plurality of datasets to align a first dataset of the plurality of datasets with the first data container object. At step 920, after rotating the first data track comprising the plurality of datasets to align the first dataset of the plurality of datasets with the first data container object, the computing platform may retrieve first information from the first dataset using the first data container object. At step 925, the computing platform may send, via the communication interface, to the first reader-writer system, the first information retrieved from the first dataset using the first data container object.

Figure 10:
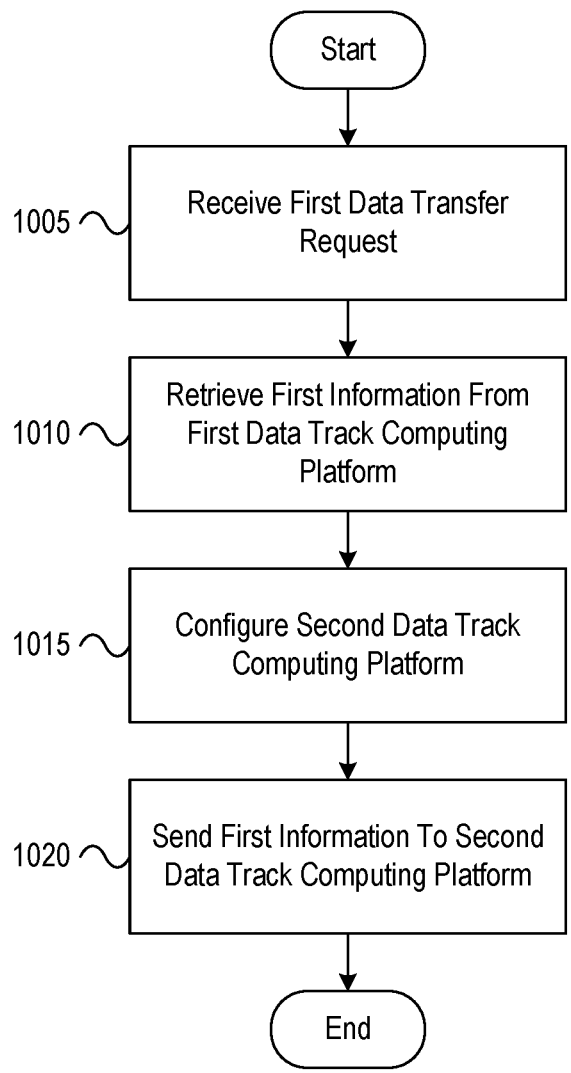
FIG. 10 depicts another illustrative method for controlling access to secure information resources using rotational datasets and dynamically configurable data containers in accordance with one or more example embodiments.

FIG. 10 depicts another illustrative method for controlling access to secure information resources using rotational datasets and dynamically configurable data containers in accordance with one or more example embodiments. Referring to FIG. 10, at step 1005, a computing platform having at least one processor, a communication interface, and memory may receive, via the communication interface, from a first enterprise user computing device, a first data transfer request comprising information scheduling a first data transfer operation. At step 1010, based on receiving the first data transfer request from the first enterprise user computing device, the computing platform may retrieve first information from a first data track computing platform. At step 1015, the computing platform may configure a second data track computing platform to receive the first information retrieved from the first data track computing platform. At step 1020, after configuring the second data track computing platform to receive the first information retrieved from the first data track computing platform, the computing platform may send, via the communication interface, to the second data track computing platform, the first information retrieved from the first data track computing platform. In addition, sending the first information retrieved from the first data track computing platform to the second data track computing platform may cause the second data track computing platform to store the first information retrieved from the first data track computing platform.

Figure 11:
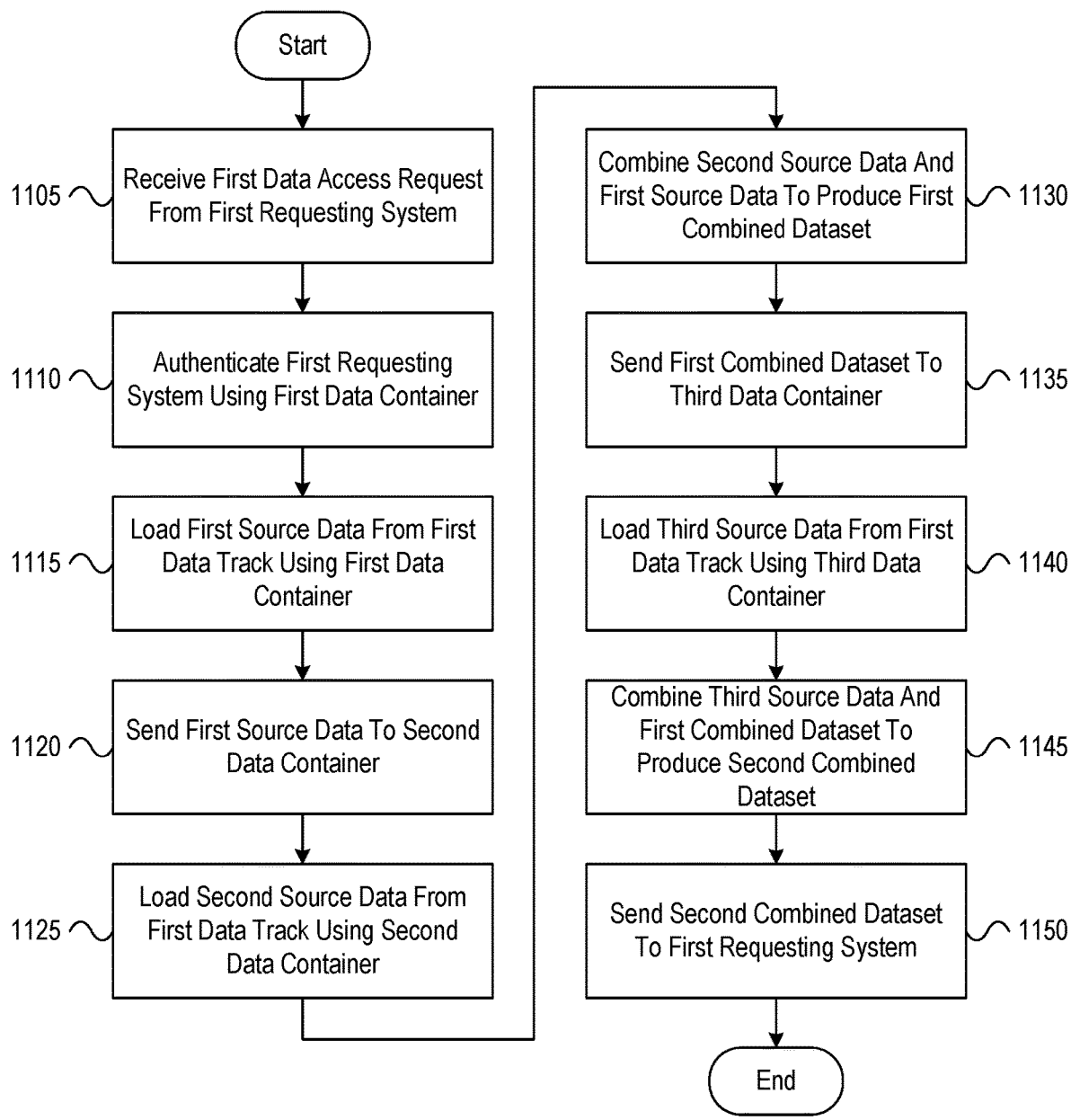
FIG. 11 depicts another illustrative method for controlling access to secure information resources using rotational datasets and dynamically configurable data containers in accordance with one or more example embodiments.

FIG. 11 depicts another illustrative method for controlling access to secure information resources using rotational datasets and dynamically configurable data containers in accordance with one or more example embodiments. Referring to FIG. 11, at step 1105, a computing platform having at least one processor, a communication interface, and memory may receive, via the communication interface, from a first requesting system, a first data access request. At step 1110, based on receiving the first data access request from the first requesting system, the computing platform may authenticate the first requesting system using a first data container object. At step 1115, after authenticating the first requesting system using the first data container object, the computing platform may load, using the first data container object, first source data from a first data track maintained by the computing platform, where the first data track maintained by the computing platform comprises a plurality of datasets. At step 1120, the computing platform may send the first source data loaded using the first data container object to a second data container object different from the first data container object. At step 1125, the computing platform may load, using the second data container object, second source data from the first data track maintained by the computing platform. At step 1130, the computing platform may combine, at the second data container object, the second source data loaded using the second data container object and the first source data loaded using the first data container object to produce a first combined dataset. At step 1135, the computing platform may send the first combined dataset to a third data container object different from the first data container object and the second data container object. At step 1140, the computing platform may load, using the third data container object, third source data from the first data track maintained by the computing platform. At step 1145, the computing platform may combine, at the third data container object, the third source data loaded using the third data container object and the first combined dataset to produce a second combined dataset. At step 1150, the computing platform may send, via the communication interface, to the first requesting system, the second combined dataset.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform, comprising:
   at least one processor;
   a communication interface communicatively coupled to the at least one processor; and
   a computer-readable medium storing computer-readable instruction that, when executed by the at least one processor, cause the computing platform to:

receive, via the communication interface, from a first requesting system, a first data access request;

based on receiving the first data access request from the first requesting system, authenticate the first requesting system using a first data container object;

after authenticating the first requesting system using the first data container object, load, using the first data container object, first source data from a first data track maintained by the computing platform, wherein the first data track maintained by the computing platform comprises a plurality of datasets;

send the first source data loaded using the first data container object to a second data container object different from the first data container object; and load, using the second data container object, second source data from the first data track maintained by the computing platform.

2. The computing platform of claim 1, wherein the computer-readable medium storing computer-readable instructions that, when executed by the at least one processor, cause the computing platform to:

combine, at the second data container object, the second source data loaded using the second data container object and the first source data loaded using the first data container object to produce a first combined dataset.

3. The computing platform of claim 2, wherein the computer-readable medium storing computer-readable instructions that, when executed by the at least one processor, cause the computing platform to:

send the first combined dataset to a third data container object different from the first data container object and the second data container object; and load, using the third data container object, third source data from the first data track maintained by the computing platform.

4. The computing platform of claim 3, wherein sending the first combined dataset to the third data container object different from the first data container object and the second data container object comprises sending the first combined dataset to the third data container object based on the first data container object having a first ruleset associated with a first data type, the second data container object having a second ruleset associated with a second data type, and the third data container object having a third ruleset associated with a third data type.

5. The computing platform of claim 3, wherein loading the third source data from the first data track maintained by the computing platform using the third data container object comprises loading the third source data from the first data track maintained by the computing platform using the third data container object based on re-authenticating the first requesting system using the third data container object.

6. The computing platform of claim 3, wherein loading the third source data from the first data track maintained by the computing platform using the third data container object comprises rotating the first data track to align a third dataset of the plurality of datasets with the third data container object.

7. The computing platform of claim 2, wherein combining the second source data loaded using the second data container object and the first source data loaded using the first data container object to produce the first combined dataset comprises filtering the second source data loaded using the second data container object and the first source data loaded using the first data container object to remove redundant data.

8. The computing platform of claim 1, wherein receiving the first data access request from the first requesting system comprises receiving the first data access request from a first reader-writer system.

9. The computing platform of claim 1, wherein receiving the first data access request from the first requesting system comprises receiving the first data access request from a data sub-processing computing platform that interfaces with an additional data track computing platform which maintains a second data track different from the first data track.

10. The computing platform of claim 1, wherein loading the first source data from the first data track maintained by the computing platform using the first data container object comprises rotating the first data track to align a first dataset of the plurality of datasets with the first data container object.

11. The computing platform of claim 1, wherein loading the second source data from the first data track maintained by the computing platform using the second data container object comprises loading the second source data from the first data track maintained by the computing platform using the second data container object based on re-authenticating the first requesting system using the second data container object.

12. The computing platform of claim 1, wherein loading the second source data from the first data track maintained by the computing platform using the second data container object comprises rotating the first data track to align a second dataset of the plurality of datasets with the second data container object.

13. A method, comprising:

at a computing platform comprising at least one processor, a communication interface, and memory:

receiving, by the at least one processor, via the communication interface, from a first requesting system, a first data access request;

based on receiving the first data access request from the first requesting system, authenticating, by the at least one processor, the first requesting system using a first data container object;

after authenticating the first requesting system using the first data container object, loading, by the at least one processor, using the first data container object, first source data from a first data track maintained by the computing platform, wherein the first data track maintained by the computing platform comprises a plurality of datasets;

sending, by the at least one processor, the first source data loaded using the first data container object to a second data container object different from the first data container object;

loading, by the at least one processor, using the second data container object, second source data from the first data track maintained by the computing platform; and combining, by the at least one processor, at the second data container object, the second source data loaded using the second data container object and the first source data loaded using the first data container object to produce a first combined dataset.

14. The method of claim 13, further comprising:

sending, by the at least one processor, the first combined dataset to a third data container object different from the first data container object and the second data container object; and loading, by the at least one processor, using the third data container object, third source data from the first data track maintained by the computing platform.

15. The method of claim 13, wherein receiving the first data access request from the first requesting system comprises receiving the first data access request from a first reader-writer system.

16. The method of claim 13, wherein receiving the first data access request from the first requesting system comprises receiving the first data access request from a data sub-processing computing platform that interfaces with an additional data track computing platform which maintains a second data track different from the first data track.

17. The method of claim 13, wherein loading the first source data from the first data track maintained by the computing platform using the first data container object comprises rotating the first data track to align a first dataset of the plurality of datasets with the first data container object.

18. The method of claim 13, wherein loading the second source data from the first data track maintained by the computing platform using the second data container object comprises loading the second source data from the first data track maintained by the computing platform using the second data container object based on re-authenticating the first requesting system using the second data container object.

19. One or more non-transitory computer-readable media storing instructions that, when executed by a computing platform comprising at least one processor, a communication interface, and memory, cause the computing platform to:
receive, via the communication interface, from a first requesting system, a first data access request;
based on receiving the first data access request from the first requesting system, authenticate the first requesting system using a first data container object;
after authenticating the first requesting system using the first data container object, load, using the first data container object, first source data from a first data track maintained by the computing platform, wherein the first data track maintained by the computing platform comprises a plurality of datasets;
send the first source data loaded using the first data container object to a second data container object different from the first data container object;
load, using the second data container object, second source data from the first data track maintained by the computing platform; and
combine, at the second data container object, the second source data loaded using the second data container object and the first source data loaded using the first data container object to produce a first combined dataset.

20. The one or more non-transitory computer-readable media of claim 19 further storing instructions that, when executed by the computing platform, cause the computing platform to:
send the first combined dataset to a third data container object different from the first data container object and the second data container object; and
load, using the third data container object, third source data from the first data track maintained by the computing platform.

* * * * *